United States Patent [19]

Lewis et al.

[11] Patent Number: 5,076,332
[45] Date of Patent: Dec. 31, 1991

[54] ARCH GEOMETRY TO ELIMINATE TUBING INFLUENCE ON LOAD CELL ACCURACY

[75] Inventors: Robert Lewis, Lindenhurst; James Hitchcock, Barrington; Michael Becker, Palatine, all of Ill.; James Vos, Burlington, Wis.

[73] Assignee: Clintec Nitrition Co., Deerfield, Ill.

[21] Appl. No.: 509,502

[22] Filed: Apr. 16, 1990

Related U.S. Application Data

[63] Continuation-in-part of Ser. No. 245,426, Sep. 16, 1988, Pat. No. 4,967,811, which is a continuation of Ser. No. 144,673, Jan. 12, 1988, Pat. No. 4,784,014, which is a continuation of Ser. No. 938,976, Dec. 5, 1986, abandoned.

[51] Int. Cl.$^5$ ............................................. B65B 3/28
[52] U.S. Cl. ........................................ 141/83; 141/9; 141/95; 141/105; 141/104; 138/106; 138/26; 177/184; 422/100
[58] Field of Search ................... 141/1, 9, 83, 94, 95, 141/96, 105, 104, 236; 138/26, 106, 118; 177/184; 422/100, 103, 104

[56] References Cited

U.S. PATENT DOCUMENTS

| | | |
|---|---|---|
| 18,870 | 12/1857 | Sheldon . |
| 970,927 | 9/1910 | Jones . |
| 1,125,319 | 1/1915 | Hewlett . |
| 1,234,024 | 7/1917 | Hewlett . |
| 1,517,594 | 12/1924 | Smythe . |
| 1,553,994 | 3/1925 | Estes . |
| 1,585,534 | 5/1926 | Crockett . |
| 1,941,613 | 1/1934 | McDonnell ........................ 138/26 |
| 2,261,028 | 10/1941 | Hopkins ............................ 138/26 |
| 2,596,593 | 5/1952 | Paxton . |
| 2,619,125 | 11/1952 | Eickmeyer et al. ............... 138/118 |
| 2,677,392 | 5/1954 | Huppertz . |
| 2,730,130 | 1/1956 | Guidry . |
| 2,943,578 | 7/1960 | McCombie . |
| 2,955,726 | 10/1960 | Feldman et al. . |
| 2,964,796 | 12/1960 | Press .............................. 138/118 |
| 2,982,368 | 5/1961 | McMahon . |
| 3,097,670 | 7/1963 | Berman . |
| 3,112,761 | 12/1963 | Swartz et al. . |
| 3,306,495 | 2/1967 | Wabers . |
| 3,319,623 | 5/1967 | London . |
| 3,323,681 | 6/1967 | Di Vette et al. . |
| 3,359,910 | 12/1967 | Latham, Jr. . |
| 3,428,218 | 2/1969 | Coja . |
| 3,532,124 | 10/1970 | Lowery ............................ 138/26 |
| 3,565,286 | 2/1971 | Latham, Jr. . |
| 3,647,118 | 3/1972 | Johnson et al. . |
| 3,656,478 | 4/1972 | Swersey . |
| 3,676,019 | 7/1972 | Self . |
| 3,708,026 | 1/1973 | Senour . |

(List continued on next page.)

FOREIGN PATENT DOCUMENTS

| | | |
|---|---|---|
| 0189491 | 1/1988 | European Pat. Off. . |
| 2640842 | 3/1978 | Fed. Rep. of Germany . |
| 1303 | of 1894 | United Kingdom . |
| 8602625 | 10/1984 | World Int. Prop. O. . |

OTHER PUBLICATIONS

Brochure of Travenol Laboratories, Inc. of one of its products, Automix High Speed Compounder.
Article by Robert R. McClendon, R. Ph., "A Comparative Evaluation of Methods Used to Compound Parenteral Nutrition Solutions", *Nutritional Support Services*, vol. 3, No. 12, Dec. 1983.
"A Microprocessor Batching System", IEEE Transactions on Industrial Electronics and Control Instrumentation, vol. 22, No. 3, Aug. 1975.

*Primary Examiner*—Ernest G. Cusick
*Attorney, Agent, or Firm*—Hill, Van Santen, Steadman & Simpson

[57] ABSTRACT

A flexible conduit coupled to a chamber of a weighing apparatus for conduiting fluid to the chamber, the conduit having a portion attached to a support spaced apart from the load cell chamber and being sufficiently arcuate in shape between the point and the load cell to substantially reduce relaxation and/or weight effects of the conduit on weight measurements. In a preferred embodiment, the arcuate portion forms a semicircular arch.

20 Claims, 33 Drawing Sheets

U.S. PATENT DOCUMENTS

| | | | |
|---|---|---|---|
| 3,712,335 | 1/1973 | Wiebe . | |
| 3,759,422 | 9/1973 | Matheney . | |
| 3,782,609 | 1/1974 | Zucconi . | |
| 3,790,029 | 2/1974 | Ward . | |
| 3,804,297 | 4/1974 | Jurjans . | |
| 3,827,467 | 8/1974 | Henley . | |
| 3,884,391 | 5/1975 | Pauliukonis . | |
| 3,896,972 | 7/1975 | Neidore et al. . | |
| 3,930,598 | 1/1976 | Slagle . | |
| 3,940,019 | 2/1976 | Kross . | |
| 3,944,261 | 3/1976 | Reed . | |
| 3,985,266 | 10/1976 | Wright, Jr. . | |
| 4,040,496 | 8/1977 | Wilson et al. . | |
| 4,065,032 | 12/1977 | Lydiksen . | |
| 4,103,722 | 8/1978 | Zollinger . | |
| 4,111,335 | 9/1978 | Arya et al. . | |
| 4,170,710 | 10/1979 | Boynton et al. . | |
| 4,174,742 | 11/1979 | Murphey . | |
| 4,181,121 | 1/1980 | Schwoboda . | |
| 4,182,383 | 1/1980 | Adomitis et al. . | |
| 4,207,871 | 6/1980 | Jenkins . | |
| 4,210,533 | 7/1980 | Astl . | |
| 4,218,197 | 8/1980 | Meyer . | |
| 4,222,496 | 9/1980 | Start et al. . | |
| 4,272,824 | 8/1979 | Lewinger . | |
| 4,275,775 | 6/1981 | Egli . | |
| 4,320,855 | 3/1982 | Ricciardi et al. . | |
| 4,342,651 | 8/1982 | Ahrens . | |
| 4,345,628 | 8/1982 | Campbell et al. . | |
| 4,372,100 | 2/1983 | Miller et al. . | |
| 4,379,663 | 4/1983 | Allison . | |
| 4,401,981 | 8/1983 | Figler . | |
| 4,408,640 | 10/1983 | Voza . | |
| 4,425,113 | 3/1984 | Bilstad . | |
| 4,437,812 | 3/1984 | Abu-Shumays . | |
| 4,438,357 | 3/1984 | Wicnienski . | |
| 4,451,255 | 5/1984 | Bujan . | |
| 4,467,844 | 8/1984 | DiGianfilippo et al. . | |
| 4,508,148 | 4/1985 | Trechsel . | |
| 4,512,764 | 4/1985 | Wunsch . | |
| 4,513,796 | 4/1985 | Miller et al. . | |
| 4,524,801 | 6/1985 | Magnasco . | |
| 4,526,215 | 7/1985 | Harrison . | |
| 4,533,347 | 8/1985 | Deckert . | |
| 4,553,958 | 11/1985 | Lecolg . | |
| 4,559,036 | 12/1985 | Wunsch . | |
| 4,561,251 | 12/1985 | Moret et al. | 138/118 X |
| 4,562,871 | 1/1986 | Astle . | |
| 4,570,822 | 2/1986 | Procacino . | |
| 4,585,148 | 4/1986 | Ito . | |
| 4,592,743 | 6/1986 | Hjertman . | |
| 4,606,420 | 8/1986 | Silver . | |
| 4,625,494 | 12/1986 | Iwatschenko . | |
| 4,648,430 | 3/1987 | DiGianfilippo et al. . | |
| 4,650,464 | 3/1987 | Ruiz et al. . | |
| 4,678,460 | 7/1987 | Rosner . | |
| 4,694,861 | 8/1987 | Goodale . | |
| 4,712,590 | 12/1987 | DiGianfilippo | 141/83 |
| 4,718,467 | 1/1988 | DiGianfilippo et al. | 141/105 |
| 4,789,014 | 12/1988 | DiGianfilippo et al. | 141/83 |
| 4,905,943 | 3/1990 | Sugiyama | 138/106 X |
| 4,967,811 | 11/1990 | DiGianfillippo | 141/83 |

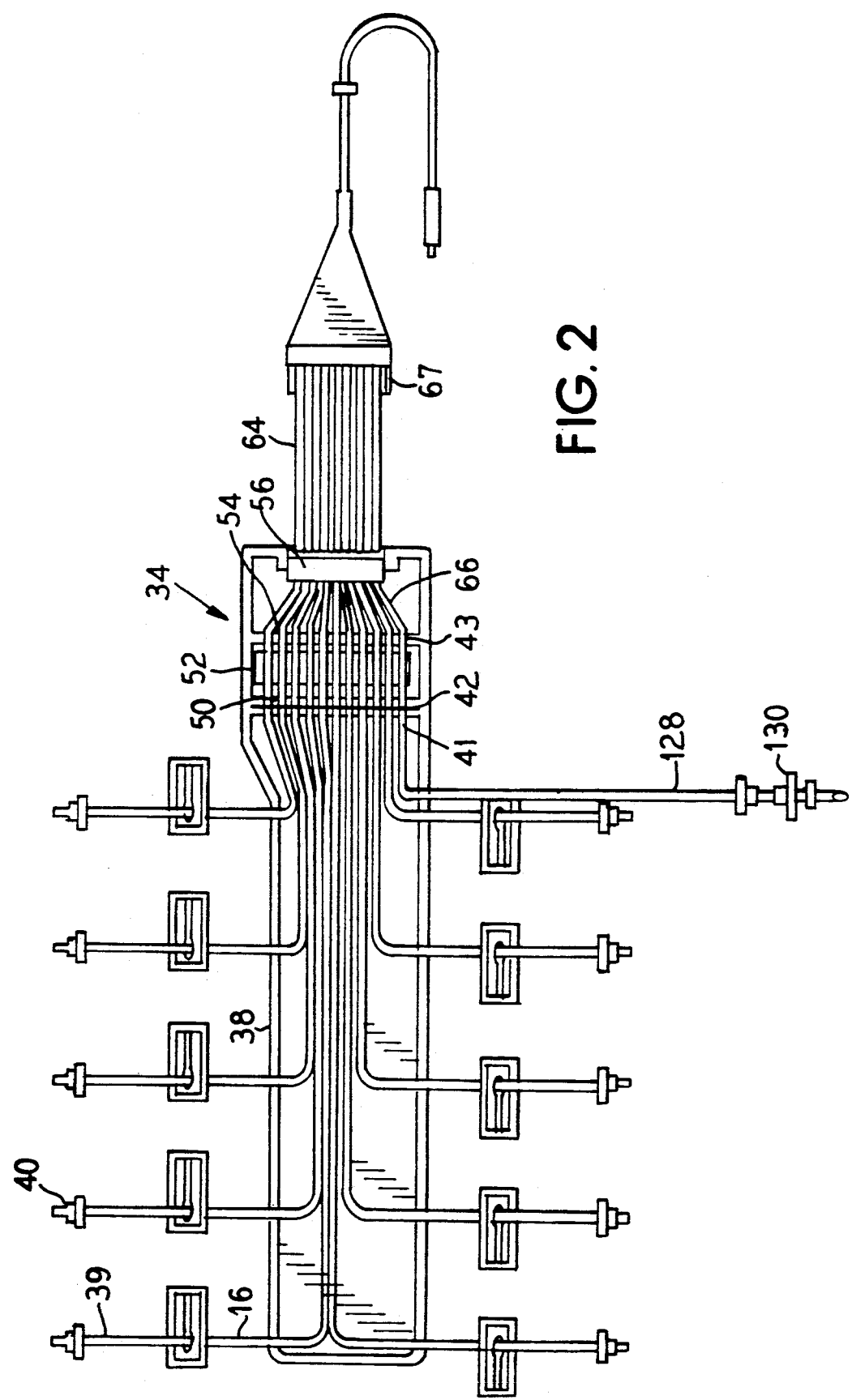

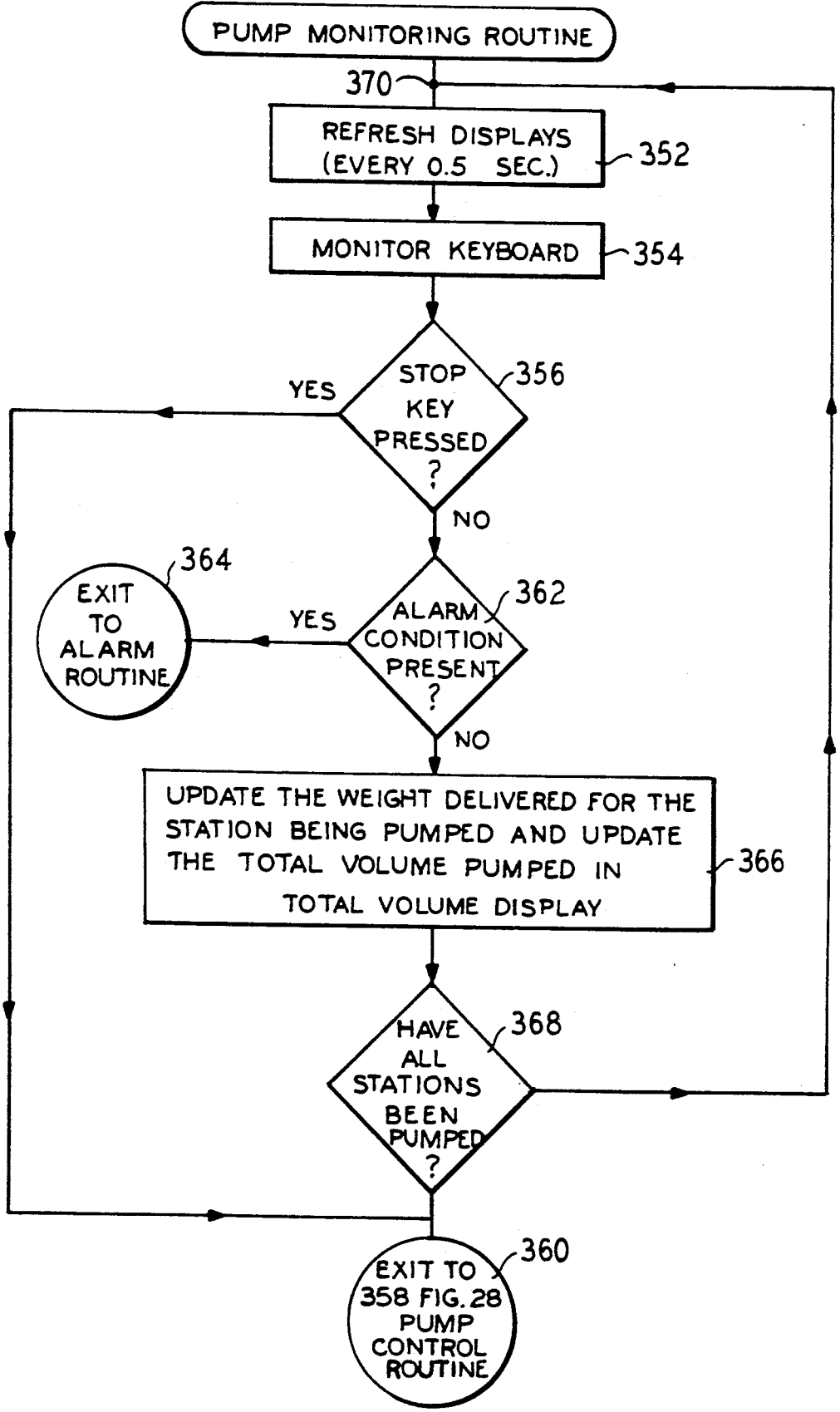

MASTER MICROPROCESSOR

PUMPING μP

PUMPING μP

PUMPING μP

MASTER μP

ARCH GEOMETRY TO ELIMINATE TUBING INFLUENCE ON LOAD CELL ACCURACY

RELATED APPLICATION DATA

The present invention is a continuation-in-part of U.S. patent application Ser. No. 07/245,426, filed Sept. 16, 1988 now U.S. Pat. No. 4,967,811 which is a continuation of U.S. patent application Ser. No. 07/144,673, filed Jan. 12, 1988, now U.S. Pat. No. 4,784,014, which was a continuation of U.S. patent application Ser. No. 06/938,976, filed Dec. 5, 1986, now abandoned.

BACKGROUND OF THE INVENTION

The invention generally relates to systems for transferring fluids from individual source containers to a receiving container, and more specifically relates to systems for transferring liquid drugs from individual vials, bottles, or bags to a single solution bag or bottle for administration to a patient.

In hospitals, it is frequently necessary to provide solutions for intravenous administration to a patient which contain a variety of drugs in a single solution container. A common example of such a need arises when a patient is receiving all of his nutritional needs intravenously. In this situation, the patient will typically receive a basic solution containing amino acids, dextrose, and fat emulsions which provide a major portion of the patient's nutritional needs. However, this solution is insufficient to maintain a patient for an extended period of time. Therefore, a typical total parenteral solution includes as many as eight to twelve additional additives. The additives are typically minute quantities of vitamins, minerals, electrolytes, etc. Therefore, when a pharmacist is preparing a solution for total parenteral nutrition, it is necessary for the pharmacist to individually add each of the additional additives to a solution container after the base solutions have been added. This is typically done with individual syringes and requires a relatively long time on the part of a pharmacist to accurately add all additives to each of the required additives.

An automatic compounding device has been recently developed to assist the pharmacist in preparing solutions for total parenteral nutrition. This device is described in U.S. Pat. Nos. 4,467,844 and 4,513,796 which are incorporated herein by reference. This device is used to assist the pharmacist in automatically compounding the base solution of amino acids, dextrose and fat emulsions. This system typically uses three or more peristaltic pumps to individually pump each of the base solutions from three or more separate source containers. Computer software also has been developed and is currently being used to program in the amount of solution required for a series of individual patients. This program is designed to operate the automated compounding equipment described in each of the above patents. This program is more fully described in U.S. patent application Ser. No. 665,268 filed Oct. 26, 1984 which is also incorporated herein in by reference. While this system has provided a tremendous advantage to the pharmacist, it is not useful for adding minute quantities of fluid additives to the receiving container. Therefore, a need exists for a device which can very accurately dispense very small quantities of fluids into a receiving container.

SUMMARY OF THE INVENTION

An object of the invention is to provide a device for dispensing very small quantities of fluids into a single receiving container.

Another object of the invention is to provide software for controlling the device as described above.

Another object of the invention is to provide a device which uses a single pump to dispense multiple fluids from multiple source containers into a single receiving container.

Yet another object of the invention is to provide a system for accurately controlling fluid flow in which fluids from multiple containers are transferred to an intermediate measuring chamber and then later automatically transferred to a receiving container.

Yet another object of the invention is to provide a means for creating positive and negative pressures in the measuring chamber described above to control fluid flow into and out of the chamber.

Another object of the invention is to provide an administration set for transferring fluids from multiple source containers to a measuring chamber, and then from the measuring chamber to a single receiving container.

Another object of the invention is to provide a device which accurately records and maintains records of the transfer of multiple fluids into a single source container.

And yet another object of the invention is to provide a means for periodically flushing the measuring chamber described above to rinse the chamber of any incompatible drugs.

The invention can be briefly described as a device for accurately transferring multiple individual fluids from multiple source containers into a single receiving container. Fluid flows from the multiple source containers through individual fluid inlet conduits into a measuring chamber having a single fluid outlet conduit in fluid communication with the single receiving container. The chamber also has a pressure conduit. A first occlusion means for selectively preventing fluid flow from each of the individual fluid inlet conduits to the chamber is provided in accordance with the invention. A pressure means or differential pressure source for selectively creating positive and negative pressures in the chamber to control the rate of fluid flow through the chamber is also provided. In order to control fluid flow from the chamber to the receiving container, a second occlusion means for selectively occluding fluid flow from the chamber outlet fluid conduit to the receiving container is provided.

Control means for controlling the first and second occlusion means and the pressure means is provided to perform various functions. For example, the control means causes the first occlusion means to allow fluid to flow through at least one of the individual fluid conduits while causing the second occlusion means to prevent fluid flow into the receiving container. The control means also simultaneously causes the pressure means to create a negative pressure in the chamber to precisely control the amount and rate of fluid flow into the chamber. The control means further causes the first occlusion means to prevent fluid flow though all of the individual fluid conduits after a predetermined amount of fluid has been delivered to the chamber. The control means then further causes the second occlusion means to allow fluid to flow from the receiving chamber through the outlet conduit while simultaneously causing the pressure means to create a positive pressure in the chamber to force fluid from the chamber into the receiving container.

The invention also provides a device wherein tubing influences on a load cell of the device are minimized. The invention thus provides a device that retains accuracy in measurement of quantities of additives over time despite relaxation of the tubing coupled to the load cell.

To these ends, in an embodiment, the invention provides a compounding device having at least one fluid conduit coupling a fluid source to a load cell, the fluid conduit including an arch portion having one end coupled to the load cell, the arch substantially having a semicircular shape.

In a preferred embodiment, the arch spans 180°.

In another embodiment, the arch portion is coupled between the load cell and a static anchor member so that one end of the arch portion is held in fixed relation to the device.

BRIEF DESCRIPTION OF THE DRAWINGS

FIG. 2 is a plan view of a transfer set in accordance with the preferred embodiment of the subject invention;

FIG. 3 (b) is a cross-sectional view of the coupler of FIG. 3 (a) taken along the line 3 (b);

FIG. 6 (b) is a cross-sectional view of a manifold of the transfer set of FIG. 2;

FIG. 7 (b) is a cross-sectional view of a chamber of the transfer set of FIG. 2;

FIG. 7 (c) is a perspective view of one embodiment of a cap used with the chamber of the transfer set of FIG. 2;

FIG. 30 is a flow chart illustrating a "pump monitoring" rountine of the preferred embodiment of the invention;

DETAILED DESCRIPTION OF THE PREFERRED EMBODIMENT

Description of the Mechanical Features of the Device

A. Overview

Figure 1:
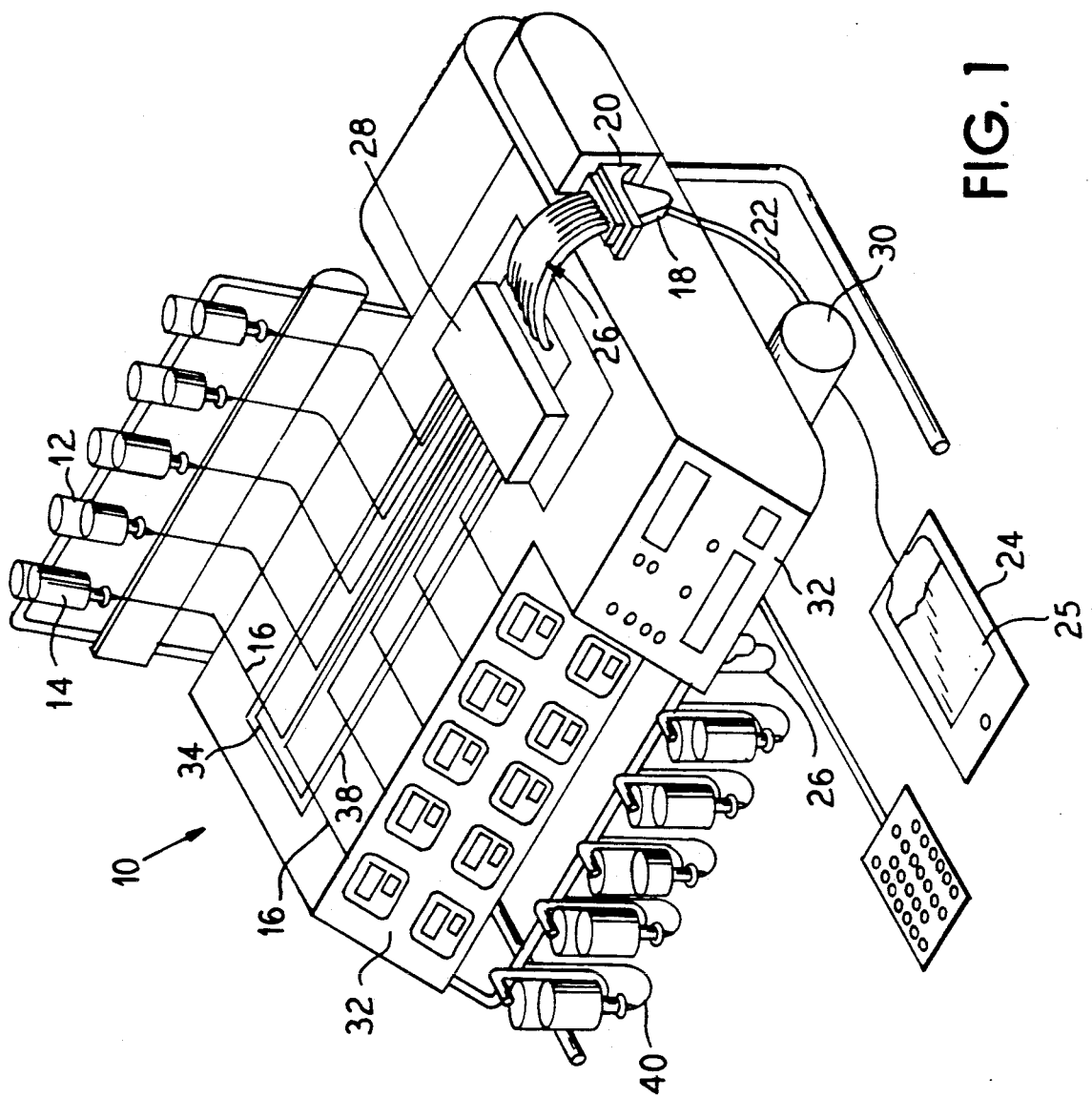
FIG. 1 is a perspective view of the overall device.

In accordance with the invention, a device 10 (FIG. 1) is provided for accurately transferring individual doses of separate fluids from individual source containers 12. Each individual source container may contain a different fluid 14. In some cases, the fluid in one container may be incompatible with fluids contained in other source containers. According to the invention, fluid is transferred from each source container 12 through a separate individual fluid conduit 16 to a single chamber 18. The chamber 18 is suspended from a load cell assembly 20. The load cell 20 constantly weighs the total weight of the chamber to develop an output signal which is indicative of the amount of fluid in the chamber 18 at any given time.

The chamber 18 is provided with a single chamber fluid outlet conduit 22 which is in fluid communication with a single receiving container 24. In accordance with the preferred embodiment of the invention, the receiving contianer 24 may have been previously partially filled with a base solution 25 typically consisting of amino acids, dextrose, and fat emulsions. However, it is not required that the receiving container contain any fluid prior to operation of the device. The chamber 18 also includes a pressure conduit 26 which is in contact with a pressure means. In the preferred embodiment of the invention, the pressure means is a single peristaltic pump which will be discussed in greater detail below. The purpose of the pressure means is to selectively create positive and negative pressures in the chamber 18 during operation of the device to control the rate of fluid flow into and out of the chamber.

The device is further provided with a first occlusion means 28 which will also be discussed in greater detail below. The purpose of the first occlusion means is to selectively prevent fluid flow from each of the individual fluid conduits 16 from entering the chamber 18 in the absence of a command from a control means 32. During operation of the device in the preferred mode of the invention, the first occlusion means 28 will only allow fluid to flow from one source container 12 to the chamber 18 at a time. In this manner, it is possible to very accurately monitor the amount of fluid flowing from each container into the chamber through the use of load cell 20. The device further includes a second occlusion means 30 for selectively occluding fluid flow from the chamber outlet fluid conduit 22 to the receiving container 24. In the preferred embodiment of the invention, the second occlusion means 30 is a solenoid occluder. This occluder will be discussed in greater detail below.

The device is controlled by a control means 32 which controls the first and second occlusion means as well as the pressure means. The control means causes the first occlusion means to allow fluid flow through at least one of the individual fluid conduits 16 while causing the second occlusion means 30 to prevent fluid flow from the chamber 18 into the receiving container. The control means enhances fluid flow into the chamber 18 by creating a negative pressure in the chamber, thereby drawing fluid from the source container 12 through the individual conduit line 16 into the chamber. After the load cell 20 has sensed that the appropriate amount of fluid has entered the chamber 18 from a particular source container 12, the control means causes the first occlusion means 28 to prevent further fluid flow from that source container. At this point, the control means 32 may then either cause the first occlusion means 28 to allow fluid to flow from another source container into the chamber, or cause the second occlusion means 30 open to allow fluid to flow from the chamber 18 into the receiving container 24.

The control means may allow a second fluid to flow into the chamber when a first fluid is still present in the chamber if the first and second fluids are compatible with each other and there is sufficient empty space remaining in the chamber to receive the entire amount of the second fluid to be dispensed. The control means will not allow a second fluid to enter the chamber when a first fluid is still present if the two fluids are incompatible with each other when properly programmed, or if insufficient froom exists in the chamber. The control means 32 enhances fluid flow from the chamber 18 into the receiving container 24 by causing the pressure means to generate a positive pressure in pressure conduit 26 which is in fluid communication with the chamber 18. This causes a positive pressure in the chamber so that when the second occlusion means 30 is opened to allow fluid to flow from the chamber to the receiving container 24, the positive pressure will force the fluid out of the chamber and into the receiving container 24. This greatly reduces fluid retention in the chamber 18.

B. Transfer Set

Referring now to FIG. 2, a transfer set 34 is described in greater detail. The purpose of the transfer set is to transfer fluids from each of the individual containers 12 into the receiving container 24. As can be seen in FIG. 2, the transfer set 34 includes a plurality of individual fluid conduits 16. Each of the individual fluid conduits is formed of a flexible piece of tubing. Various materials can be used to make the flexible conduits such as polyvinylchloride (PVC) or polyethylene tubing. Polyethylene tubing may be desired when the device is used with drugs that are incompatible with PVC. A proximal end of each of the individual conduits 16 is mounted in a tray 38. The purpose of the tray is to maintain each conduit 16 in a spaced-apart relationship from the other conduits kand to keep the tubes organized when the transfer set is being mounted onto the device 10. In the preferred embodiment, the tray is a vacuum-formed plastic tray made of PVC or glycol-modified polyethylene teraphthalate (PETG).

In the preferred embodiment of the invention, the tray is specifically designed so that the distal end 39 of each fluid conduit 16 is positioned adjacent to the particular source container 12 to which the distal end 39 of the conduit 16 is to be connected. Referring again to FIG. 1, the individual conduit 16 exits tray 38 in such a manner that half of the individual conduits 16 are directed to one side of the device 10, while the other half of the individual conduits are directed downwardly to the other side of the device. Since the source containers in the preferred embodiment are disposed along both sides of the device 10, this greatly assists the pharmacist in insuring that the appropriate individual conduit 16 is connected to its respective container 12 when the transfer set is placed in the device 10.

In one embodiment of the invention, each of the individual conduits may utilize a color-coded adaptor on the tubing to indicate the identity of a particular tube. In the preferred embodiment, each tube contains a vented spike 40 at the distal end. This spike 40 is used to provide fluid communication between the distal end of the tubing 16 and an individual container 12. The purpose of providing a vented spike 40 is to allow air to vent into the source container 12 as the fluid is being dispensed from the source container when the source container is a rigid, nonvented vial. Each color-coded adaptor contains a clip to secure the spike 40. This allows removal of the spike if contamination occurs.

It is currently envisioned that the source containers will be formed of either glass or plastic vials, bottles, or bags. However, if flexible containers are used as the source containers, or if the vials are vented rigid vials, it is not necessary to provide venting in the spike.

Figure 3A:
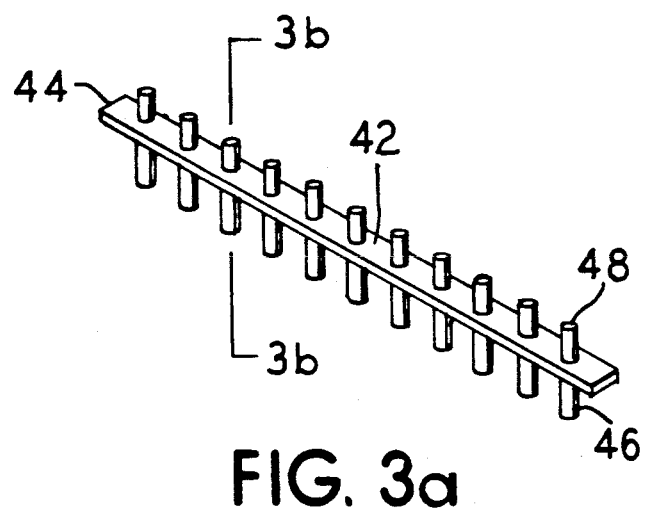
FIG. 3 (a) is a perspective view of a coupler used in the transfer set of FIG. 2.
Figure 3B:
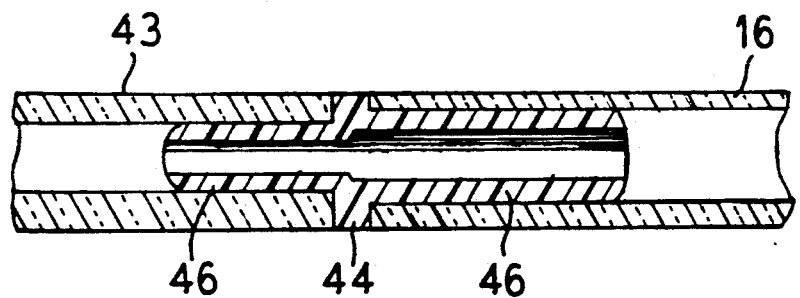

Referring once again to FIG. 2, the tray 38 contains a coupler 42. The proximal end 41 of each fluid conduit 16 is attached to one side of the coupler. Individual tubes 43 which are highly compliant are attached to the other side of the coupler. The coupler is illustrated in greater detail in FIGS. 3 (a) and (b). As can be seen in the figures, the coupler 42 includes a wall 44 which contains a first series of coupling conduits 46 extending from one side thereof and a second series of coupling conduits 48 extending from the other side of the wall 44. Each of the first and second coupling conduits in the series is in fluid communication with one another so that when the distal end of each one of the conduits 16 is fixed in fluid communication with one of the first series of conduits 46, and a proximal end of one of the highly compliant individual tubes 43 is attached to one of the second series of conduits 48, fluid communication is produced between conduit 16 and its respective highly compliant individual tube 43. While other methods of producing fluid communication between conduits 16 and individual tubes 43 may be used in accordance with the invention, the coupler illustrated in FIGS. 3 (a) and (b) represents one system for attaching the two portions of tubing to one another while maintaining the tubes in a highly organized manner.

Referring once again to FIG. 2, as can be seen in this figure, the tray 38 includes a first series of finger-like projections 50 which maintain the compliant tubes in a spaced-apart relationship from one another immediately adjacent the coupler 42. The compliant tubes 43 are then positioned in the tray such that they pass between an open section or window 52 in the tray. When the tray is mounted in the device 10, the open section is in direct contact with the first occluder means 28 to provide appropriate occlusion of the compliant tubes 43, as will be discussed in greater detail below.

As can be seen in FIG. 2, the individual tubes 43 then pass through a second series of finger-like projections 54 downstream from the window. The second series of finger-like projections also maintains the tubing in the appropriate position to ensure that occlusion of the appropriate tube occurs. As will be obvious to one skilled in the art based on the teachings herein, it is possible to provide a variety of systems for maintaining the tubing in the appropriate position.

One end of the tray 38 is provided with a mounting means or elbow 56 for maintaining the individual tubes 43 as the tubes exit the tray. The mounting means is specifically designed to position the tubes in an upwardly extending position to reduce mechanical stress effects of the tubes on the chamber 18. In other words, it is important that the tubes 64 do not create a variable force on the chamber 18 which would erroneously effect load-cell readings during operation of the device. This aspect of the invention will be discussed in greater detail below.

Figure 41:
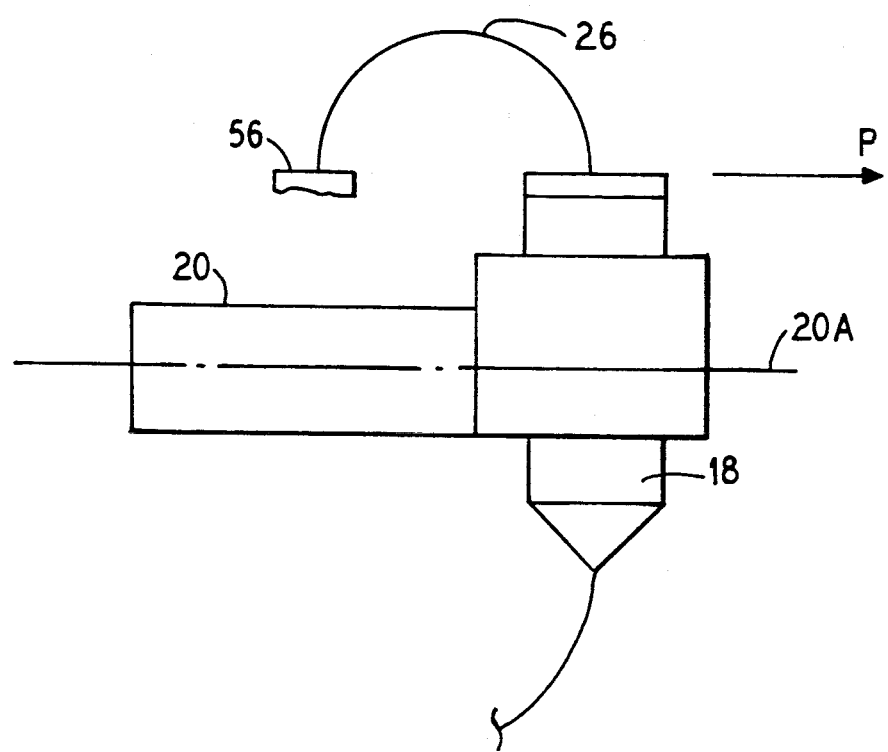
FIG. 41 is a diagrammatic illustration of a portion of the device of FIG. 1 containing a flexible tube shaped in accordance with the principles of the invention.

Preferably, the lengths 26 of the individual tubes 43 that extend between the elbow 56 and the load cell 20 are selected such that a series of arches are formed, each arch effectively comprising a portion of a circle spanning about 180°. This is best illustrated in FIG. 41. This geometry is selected so that tubing influences on the load cell 20 are eliminated, or at least minimized.

The weighing and transfer requirements of the system necessitate the use of flexible plastic tubing lines as the tubes 43 to supply solution to the outlet conduit 22 which is in fluid communication with the receiving container 24. The half circle arch design minimizes the influence of a single or multi-lumen flexible tubing bridge connected from the static surface of the system at the first occlusion means 28 to the bending arm of the load cell 20.

Absent use of a suitable arch shape, the long term creep of the flexible tubing 43 can cause dynamic zero changes in the load cell readings. Additionally, the flexible tubing can have a spring affect on the load cell span reading thus introducing inaccuracies in the accounting of weight changes on the load cell 20. This can cause inaccurate readings of quantities of solutions transferred to the container 24.

Figure 40:
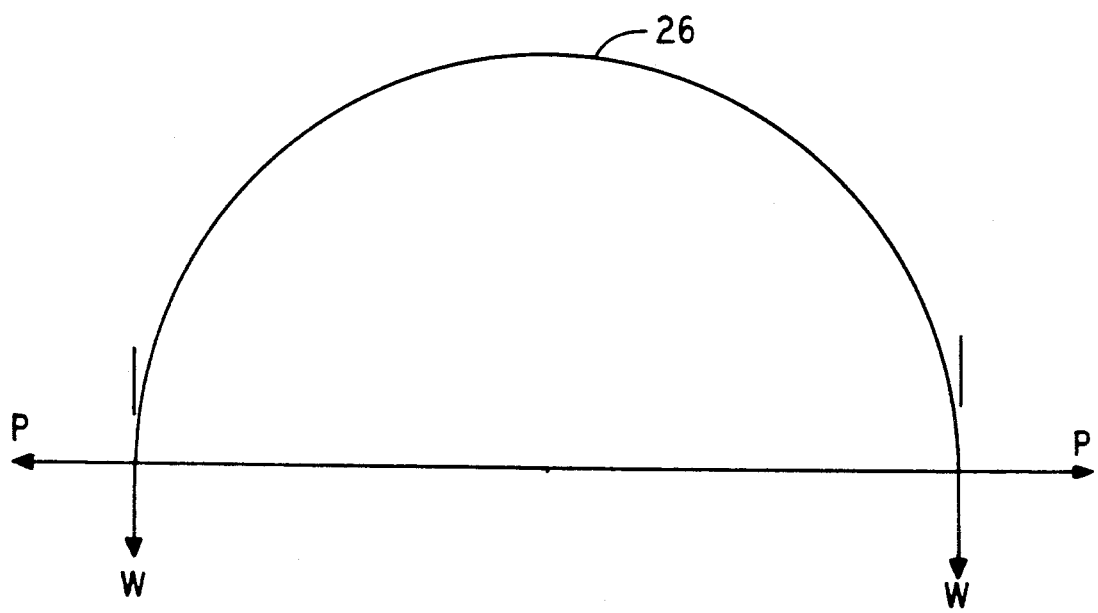
FIG. 40 is a diagrammatic illustration of an arch-shaped flexible tube and the forces exerted by the tube.

As illustrated in FIG. 40, the arched portion 43 of the tubing exerts two orthogonal forces on the load cell 20: a vertical force W and a side loading force P. The vertical force W is a function of the weight of the tubing and the bending imparted to the tubing. The side loading force P is a function of the resiliency (i.e., elasticity) of the tubing.

Generally, if the tubing is held static and imparted with a symmetrical semicircular bend that spans 180°, as illustrated in FIG. 41, the force W exerted on the load cell 20 will be equal to one-half ($\frac{1}{2}$) of the weight of the tubing extending between the tubing bridge and the load cell. The side loading force P will be determined from the tendency of the tubing to return to a straight line shape.

The sensitivity of the load cell 20 to the side loading force P is referred to as the eccentric load sensitivity. In the preferred load cell, this sensitivity is negligible by design.

It can be appreciated that the side loading force P is greatest when the tubing 43 is first installed due to relaxation of the material in conforming to its new geometry. It can also be appreciated that the above geometry is a theoretical model and that in practice, imperfections in the tubing may cause some skewing of the forces involved. Therefore, it is also desireable to use a material of low comparison set to minimize the dynamic affects of these skewed forces. This becomes especially true in cases where a plurality of tubes are employed such as the eleven employed in the illustrated embodiment.

When fluid is transferred to the load cell 20, the load cell arm 18 will deflect thereby altering the shape of the tubing 43. The effect of this deflection in the form of a resistance force to downward deflection due to tubing stiffness can be calculated using the virtual work method for deflections set forth in E. P. Popov, *Mechanics of Materials*, page 543, equation 15-12 (1976).

In essence, the equation employed is used to answer the question: For a given deflection of the tubing due to the addition of a fluid to the load cell chamber, what force will the tubing apply opposite the weight force of the fluid? To rephrase the question: If a weight of 1 gram is applied to the load cell 20, how much less will the load cell 20 read due to tubing stiffness?

Using the equation set forth in this publication, it has been determined that a transfer set including 11 tubes made of a low modulus material such as silicone will exert a resistance force which is negligible when 1 gram weight is applied to the load cell 20.

Figure 4:
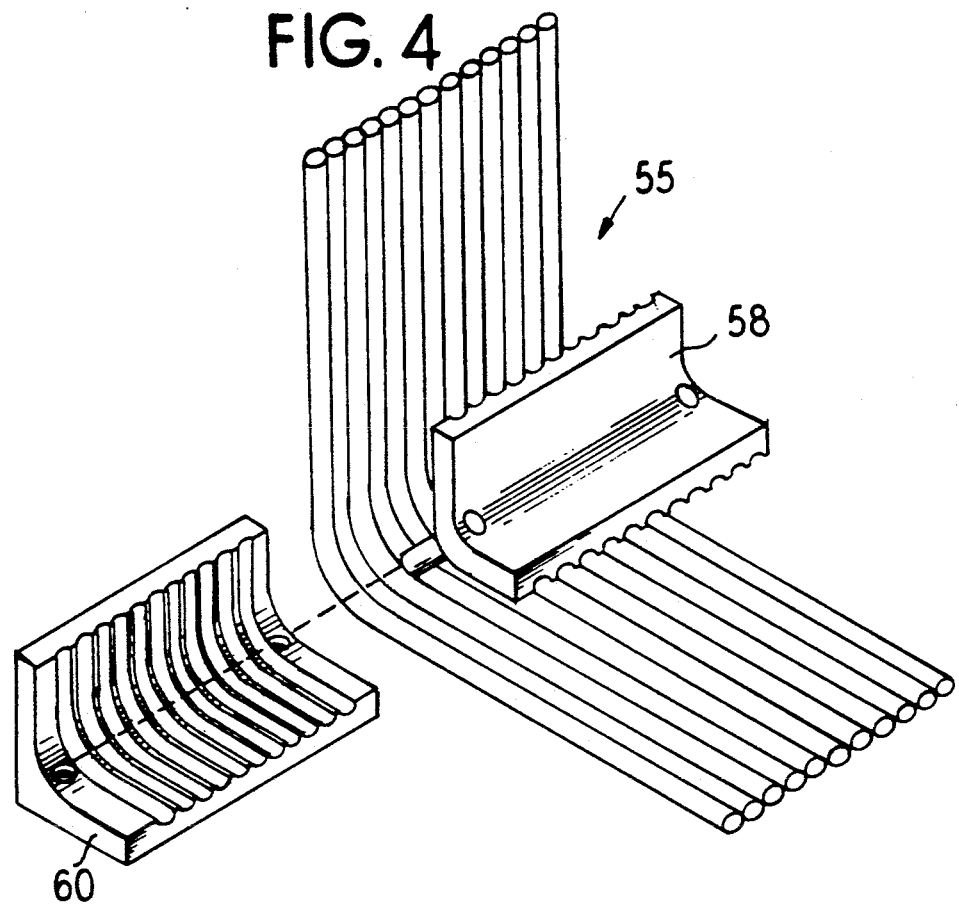
FIG. 4 is an exploded view of a pair of mating plates and its associated tubing as used in the transfer set of FIG. 2.
Figure 5A:
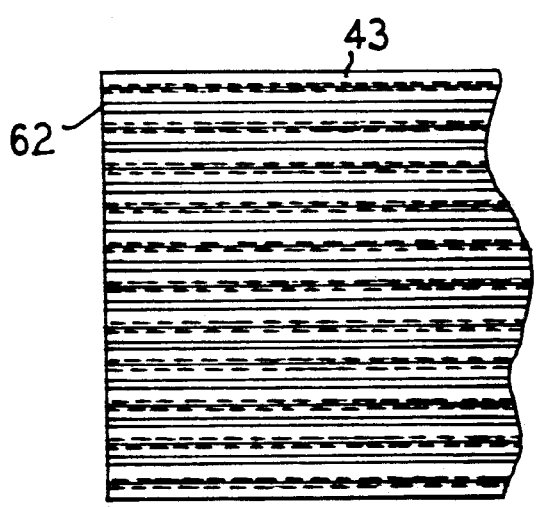
FIGS. 5 (a) and (b) are side and end views, respectively, of highly compliant tubing used in the set of FIG. 2.
Figure 5B:
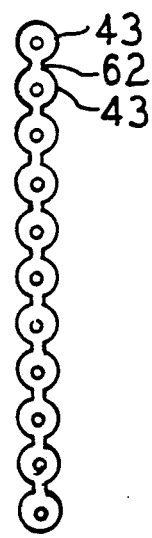

The mounting means 56 is more clearly described in FIG. 4. As can be seen in FIG. 4, the mounting means 56 in the preferred embodiment consists of a pair of mating plates 58 and 60. Each of the plates contain parallel grooves to receive each of the individual tubes. One of the purposes of the grooves is to space the tubes more closely to one another and to direct the tubes in the upward position as described above. In the preferred embodiment of the invention, the individual tubes 43 can be extruded as a single piece as illustrated in FIGS. 5 (a) and (b). As can be seen in FIGS. 5 (a) and (b), all of the tubes 43 can be formed as a unitary piece with relatively thin connecting portions 62 connecting each tube to its adjacent tubes. After manufacture of the tubes using this technique, a first section 64 (FIG. 2) of the tubes can be maintained as a unitary piece, while a second section 66 of the tubes can be individually split to form the individual tubes which are mounted between the coupling means 42 and the mating plates 56 so that they pass through window 52.

Figure 6A:
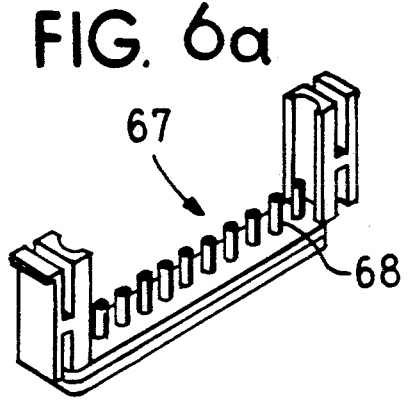
FIG. 6 (a) is perspective view of a manifold of the transfer set of FIG. 2.
Figure 6B:
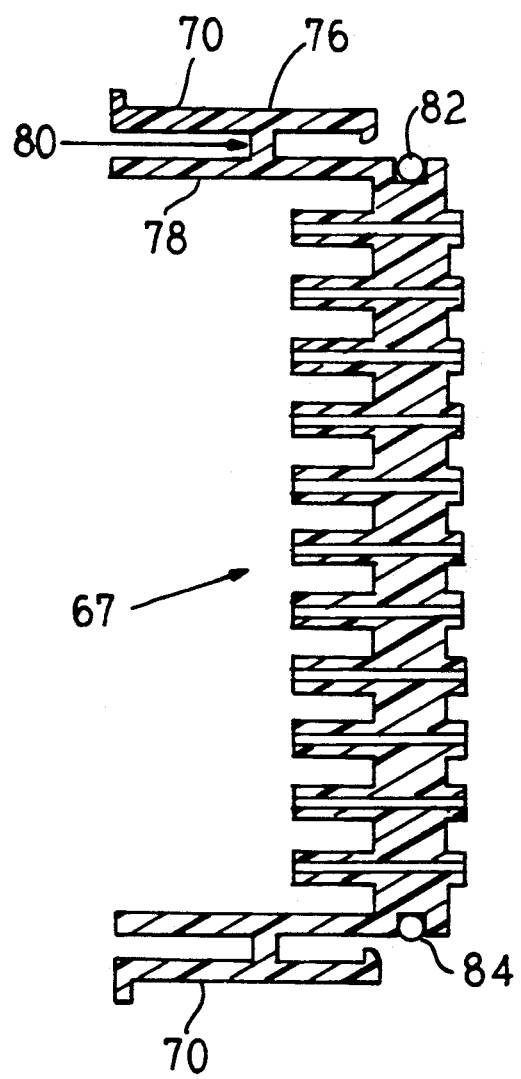

As can be seen in FIG. 2, one end of the individual tubes 43 is connected to a manifold 67 in the upper portion of chamber 18. The manifold is described in more detail in FIGS. 6 (a) and (b). As can be seen in FIG. 6 (a), the manifold includes a series of connector conduits 68 to which one end of each of the individual tubes 43 can be attached to provide fluid communication between the individual fluid tubes and the chamber when the manifold is connected to the chamber. The manifold has individual, spaced-apart, drop-former structures for each line for discouraging accumulation of droplets on the manifold. This prevents possible mixing of incompatible solutions due to droplets hanging on the manifold. This also prevents weighting of materials that were not actually transferred into the container.

Figure 7A:
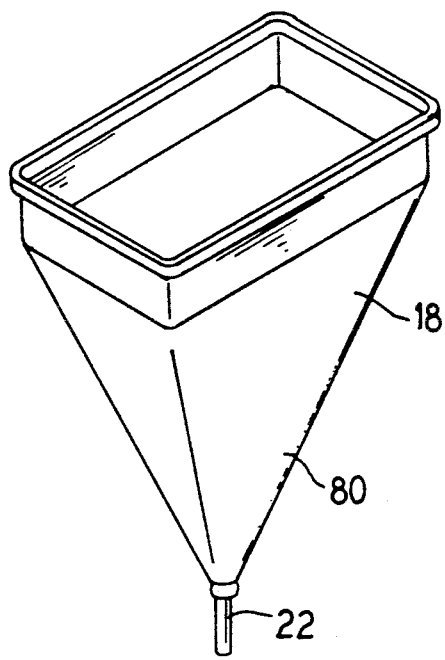
FIG. 7 (a) is a perspective view of one embodiment of a chamber of the transfer set of FIG. 2.
Figure 7C:
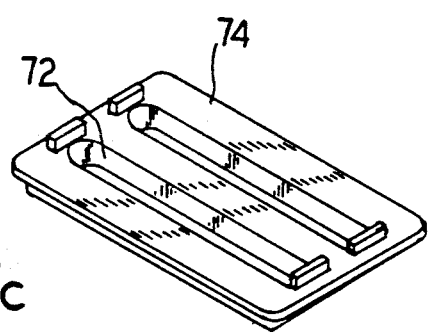
Figure 7B:
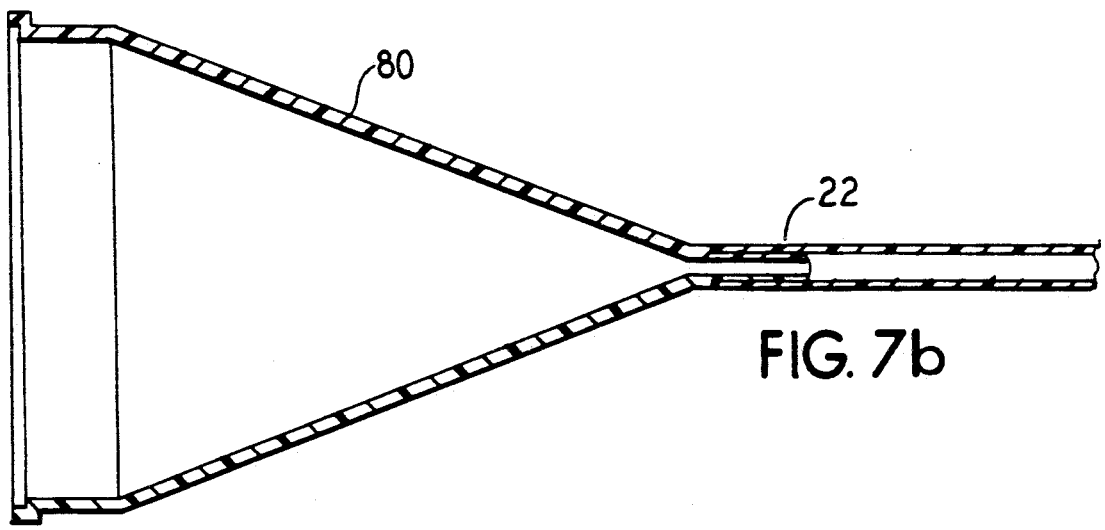

The manifold 67 can be disconnected from the chamber in the 20 preferred embodiment of the invention. This feature of the invention allows the user of the device to change chambers 18 after each patient without changing the rest of the tubing in the transfer set. While it is not currently envisioned that it will be necessary to change the chamber after preparing a solution, for each individual patient, it may occasionally be desirable to use a new chamber whenever a highly incompatible drug or a highly toxic drug has been dispensed using this device. As can be seen in FIG. 6 (b), the mechanism by which the manifold is releasably engaged with the chamber includes a pair of latches 70. Each latch can be flexed to release the manifold 67 from a locking groove 72 in the top or cap 74 of the chamber 18, as illustrated in FIG. 7 (c). In the preferred embodiment of the invention, the latch consists of an arm 76 which is mounted on a frame 78 of the manifold. A flexible connecting portion 80 maintains the arm 76 in a parallel relationship to a portion of the frame 78 of the mainfold. The latch 70 can be flexed so that the arm 76 and the frame 78 are no longer parallel with one another to release the manifold from the cap 74 of the chamber.

In order to provide a temporary seal between the manifold and the chamber cap 74, in the preferred embodiment of the invention, a gasket 82 is provided around a groove 84 in the manifold. Typically, the gasket is formed of silicone rubber or neoprine, however, other materials may be used. The gasket provides an air-tight seal between the manifold and the cap during engagement of the manifold to the cap of the chamber.

C. Chamber

The chamber of the preferred embodiment is more clearly described in FIGS. 7 (a), (b) and (c). As can be seen in FIG. 7 (a), the chamber 18 has a generally rectangular cross-sectional area in the preferred embodiment. The purpose providing a rectangular area for the chamber is to allow the body of the chamber to be placed as close as possible to the device 10 when the transfer set 34 is loaded in the device. The chamber is also designed to have downwardly sloping walls 80 from the top of the chamber to the outlet conduit 22. This also helps absorb impact on the load cell from the acceleration of the solution due to gravity. The effective height for acceleration is reduced by the funnel shape. This also reduces splashing which means less need for a rinse cycle. This is to enhance fluid flow from the chamber through the outlet conduit 22. As will be readily apparent to one skilled in the art, it is possible to design chambers having other shapes.

The key features of the chamber are the fact that a pressure line 26 (FIG. 1) is in communication with an upper portion of the chamber and that a manifold 67 delivers individual fluids from each of the individual fluid lines into the chamber through a separate fluid path. This means that any mixing of the fluids does not occur until the fluid enters the chamber. As discussed above, it is possible to prevent mixing of fluids in the chamber if desired by emptying the chamber after each individual fluid has entered the chamber.

D. Outlet Conduit

Figure 15:
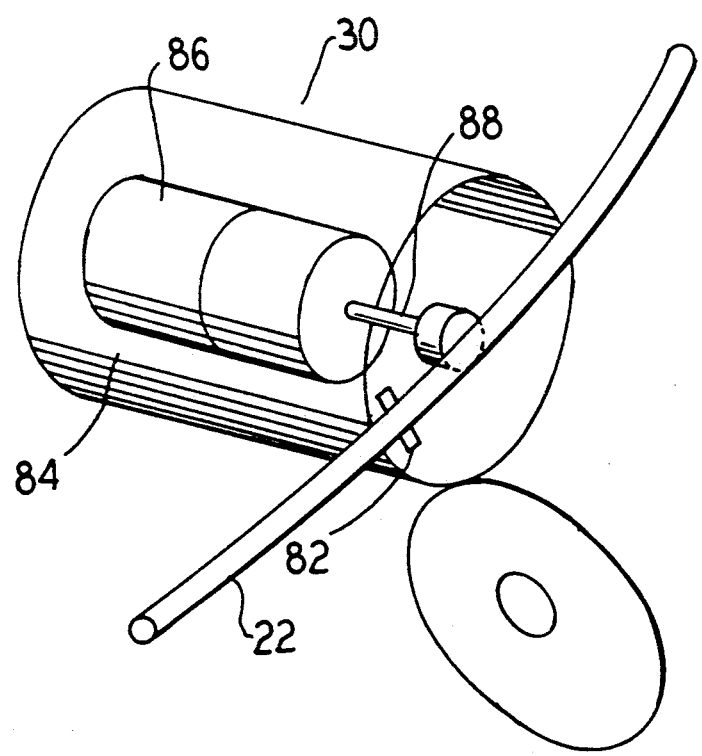
FIG. 15 is a perspective view of the second occlusion means of the device.

An outlet conduit 22 is in fluid communication with the lowermost portion of the chamber in the preferred embodiment of the invention. Referring again to FIG. 1, the secondary occlusion means 30 is provided in the preferred embodiment of the invention to prevent fluid flow from the chamber as the chamber is being filled. The secondary occlusion means 30 is described in greater detail in FIG. 15 which is an isometric view of the preferred embodiment of the invention. As can be seen in the figure, the outlet conduit 22 is provided with a registering means such as a tab 82 which fits in a tab receiver in the body 84 of the secondary occlusion means. The outlet conduit has a circular orientation in the preferred embodiment to reduce mechanical stress effects in an upward fashion on the chamber.

In the preferred embodiment of the invention, the secondary occlusion means is an energizable solenoid 86 with a rod 88 moveable from an extended position to a withdrawn position in which in the withdrawn position, the rod does not contact the chamber fluid outlet conduit 22. In the extended position, the rod contacts the conduit 22 to prevent fluid flow through the conduit. In the preferred embodiment of the invention, when the solenoid is not energized, the rod is in the extended position to occlude fluid flow. Thus, flow from the chamber will always be occluded when the device is operating unless the control means 32 energizes the solenoid 86 to retract the rod 88.

E. First Occlusion Means

Figure 9:
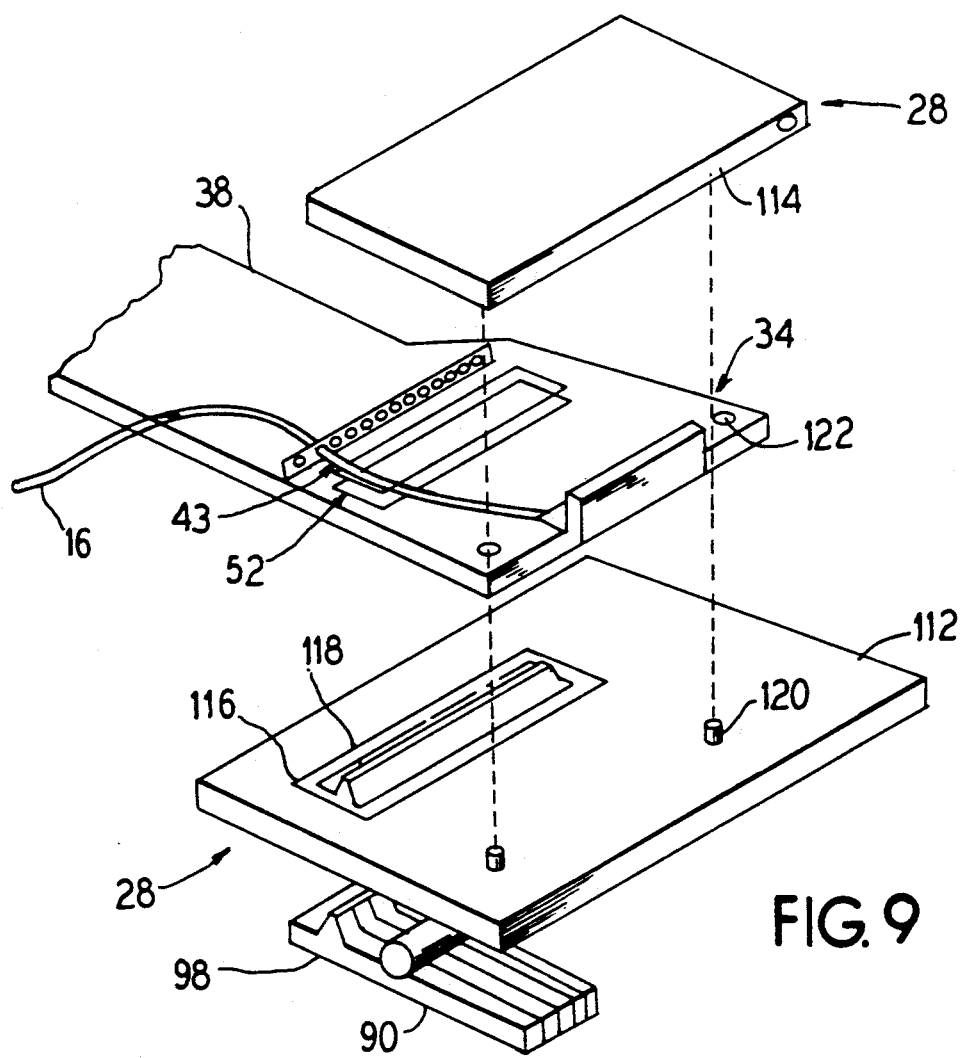
FIG. 9 is another exploded perspective view of the first occlusion means of the device.

Referring now to FIG. 9, when the transfer set 34 is positioned in the device, the tray of the set 38 is positioned so that the window 52 is positioned adjacent to the first occlusion means 28. Each of the compliant individual tubes 43 adjacent to the window 52 is positioned adjacent to multiple individual occluding arms 90 in the first occlusion means.

Figure 8:
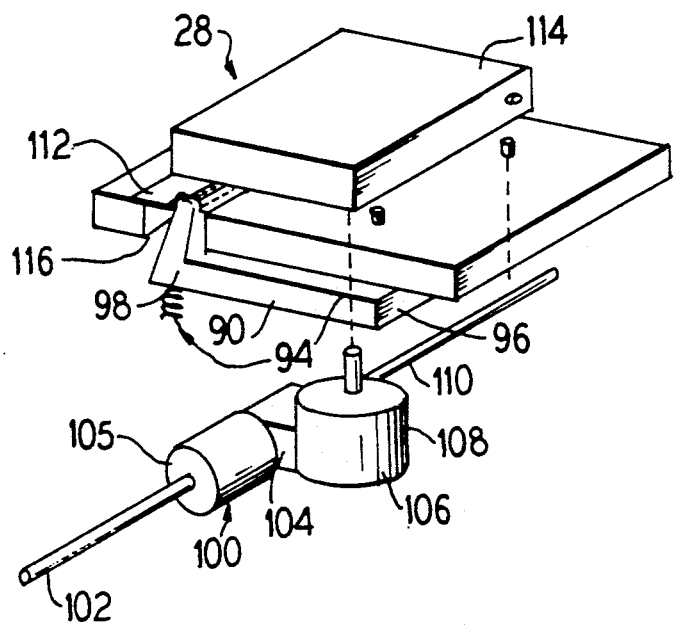
FIG. 8 is a partially exploded perspective view of the first occlusion means fo the device.

The operation of the first occlusion means is more clearly described in FIG. 8. As can be seen in the figure, the occlusion means includes a frame 112 for receiving a portion of each of the compliant individual tubes (not shown). As discussed above, the compliant individual tubes are positioned in spaced-apart parallel relationship with one another in the frame. Multiple occluder arms 90 are pivotably mounted in the frame. Each of the arms is pivotable from a first to a second position in which when each arm is in the first position, fluid flow through its respective compliant individual tubes 43 is totally occluded. When the arm 90 is in the second position, fluid flow through its respective conduit is allowed. The first occluder means 28 is provided with a multiple individual biasing means for biasing each one of the arms in the first position. In the preferred embodiment of the invention, the individual biasing means consists of a spring 94 positioned at a first end 98 of each of the arms 90 to cause the same end 98 of each of the arms to be forced toward the compliant individual tubes 43 to cause occlusion of the tubes. More specifically, each spring 94 is positioned below the first end of the arm 98 to cause occlusion of the individual tubes.

The first occluding means 28 is also provided with a first drive means 100 for overcoming the individual biasing means 94 to force at least one of the arms 90 into the second position in response to a command from the control means 32. In the preferred embodiment of the invention, the first drive means includes a drive screw 102 mounted in the frame in a traverse position with respect to the individual tubes 43. A carriage 104 is provided on the drive screw. In the preferred embodiment of the invention, a motor 105 is provided on the carriage 104 to move the carriage 104 along the drive screw in response to a command from the control means 32. The carriage is moveable along the drive screw so that the carriage can be positioned immediately below each of the individual occluder arms 90. A bias overcoming means 106 is mounted on the carriage 104 between the carriage and the individual occluder arms for overcoming only one of the individual bias means, or springs, 90 when the bias overcoming means 106 is immediately below one of the individual occluder arms 90. In the preferred embodiment of the invention, the bias overcoming means 106 is a single solenoid 108 which includes a rod 110 moveable from a withdrawn position to an extended position. In the withdrawn position, the rod does not contact an adjacent occluder arm 90. In the extended position, the rod forces an adjacent occluder arm 90 from the first to the second position to cause the first end 98 of the occluder arm 90 to retract from its associated individual tube 43. This allows fluid to flow through the individual conduit. In the preferred embodiment of the invention, the rod 110 has a width that is less than the distance between the spaced apart portions of the individual occluding arms so that only one of the including arms may be contacted at a time. This provides a fail-safe means for insuring that fluid is allowed to flow through only one individual fluid conduit at a time.

In the preferred embodiment of the invention, the first occlusion means 28 includes a frame 112 and a hinged door 114. The hinged door can be open to receive the window portion 52 of the transverse set 34. The frame 112 includes an aperture 116 to receive a portion of the first end 98 of each of the individual occluding arms 90. The aperture is covered with a resilient material 118 in the preferred embodiment of the invention to limit the possibility of fluid leakage into the drive means 100 of the first occluder means 28. This resilient material 118 may be formed of silicone in the preferred embodiment.

In one embodiment of the invention, the first occlusion means 28 may include a sensing means for detecting the position of each of the compliant individual tubes 43 in the frame and for determining whether the individual tubes are occluded by the arms. This sensing means may include a series of spring-loaded switches in the door 114 of the frame. Typically, these switches may be two-position switches which would detect the presence of an occlusion force on each of the individual tubes when the door 114 is closed over the conduits. If a tube is not present in its appropriate position, or if an occlusion arm is not properly biased to include its respective conduit, a relatively low force would be detected by the two-position sensors indicating a possible malfunction of the device.

In one embodiment of the invention, the tray of the transfer set and the frame of the first occluder are provided with a mating means to ensure proper placement of the tray in the frame of the first occluder. In the preferred embodiment of the invention, as seen in FIG. 9, the mating means consists of a pair of outwardly extending pegs 120 in the occluding frame 112, and a corresponding pair of apertures 122 in the tray of the transfer set. Thus, when an operator places the tray of the transfer set into the frame of the occluder, the apertures 122 must be positioned over the pegs 120 in order for the door 114 of the frame to close. This is one mechanism by which the position of the compliant individual tubes 43 is checked for proper location.

F. Pressure Means

Figure 10:
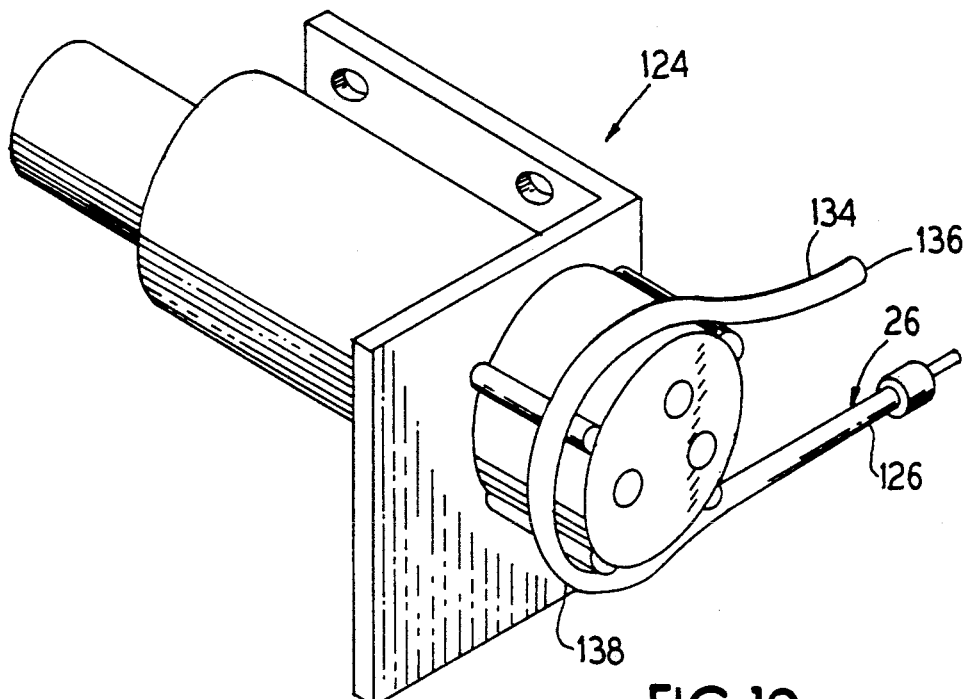
FIG. 10 is a perspective view of the pressure means for selectively creating positive and negative pressures in the chamber of FIGS. 7 (a)–(c)

As discussed above, a pressure means 124 (FIG. 10) is provided for selectively creating positive and negative pressures in the chamber 18 to control the rate of fluid flow through the chamber. The pressure means is in fluid communication with a second end 126 of the pressure conduit 26. In the preferred embodiment of the invention, the pressure conduit 26 is simply a conduit line 128 of the transfer set 34 as illustrated in FIG. 2. This conduit line 128, unlike the other individual conduit lines 16, is not connected to an individual source container. Instead, the conduit line 128 is provided with a filter means 130 for filtering air entering the conduit line 128 and is connected to a pump.

Figure 11:
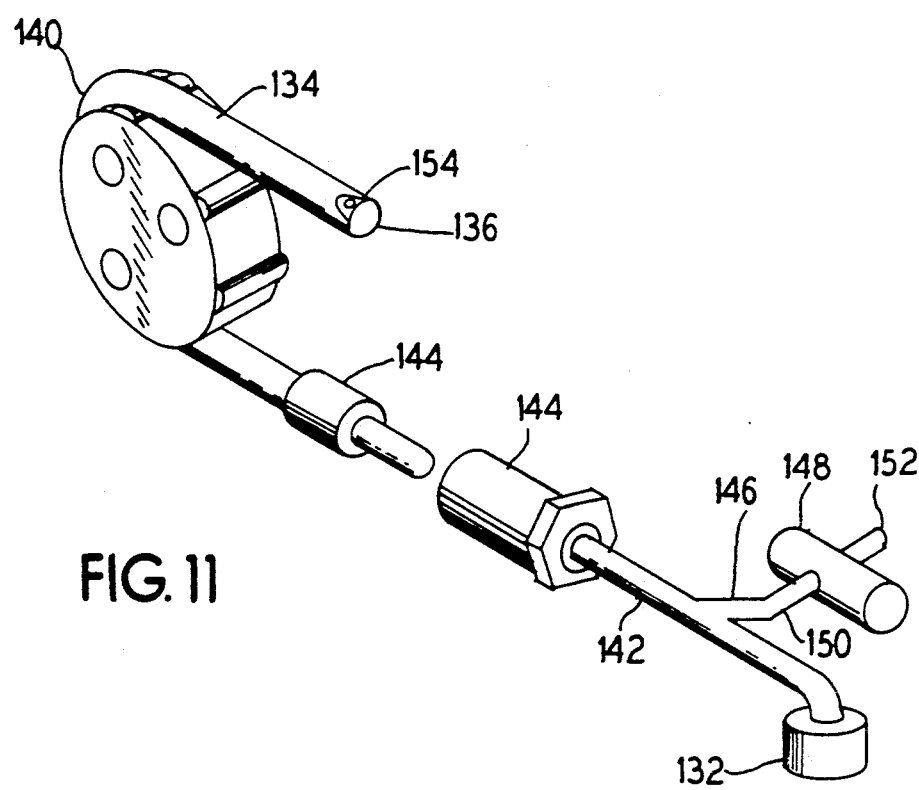
FIG. 11 is a perspective view of the tubing used in the pressure means of FIG. 10 in conjunction with a peristaltic pump head and of an air venting means used in one embodiment of the invention.

In the preferred embodiment of the invention, the filter means is a 0.22 micron filter 130. A 0.22 micron filter is used in the preferred embodiment to provide a bacterial barrier between the chamber and the environment. The filter 130 includes a coupling device for coupling the air line 128 to a connector 132 in the pressure means as illustrated in FIG. 11. A flexible tubing 134 having a first end 136 open to the environment is positioned adjacent to a peristaltic pump 138. In one embodiment of the invention, it may be desired to place a filter for filtering out large particles in the air before the air enters the first end 136 of the flexible tubing. The filter may be in the form of a porous plug 154 capable of filtering particles that are greater than 0.22 microns.

The peristaltic pump can rotate in either direction to either pull air from the environment into the first end of the flexible tubing, or to force air that is in the tubing out of the 30 tubing. In the preferred embodiment of the invention as seen in FIG. 11 (a), the tubing 134 can consist of a first portion 140 and a second portion 142. The first and second portions can be connected to each other with a quick-disconnect coupler 144. In the preferred embodiment of the invention, the first portion of tubing is a highly compliant tube formed of silicone or other material to increase the accuracy of the pump in terms controlling precise amounts of air flow through the tubing with a minimum amount of force from the peristaltic pump. The first and second portions of the tubing are connected to each other with a quick-disconnect device to allow the first portion to be replaced if it becomes worn from usage.

Figure 12:
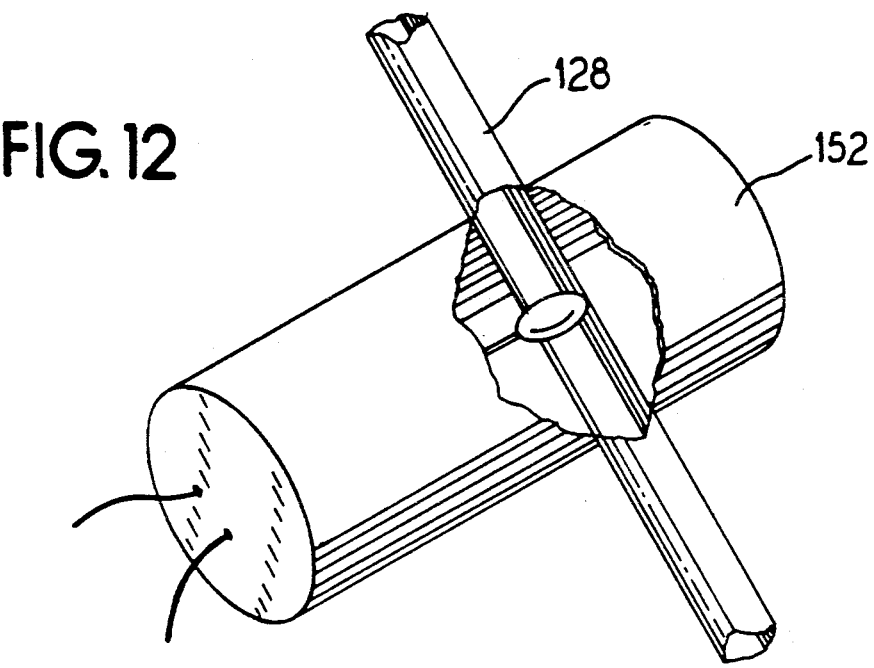
FIG. 12 is a partially-broken away end view of a air relief valve of the pressure means of FIG. 10.

In one embodiment of the invention, the second portion of tubing 142 may include a Y-site 146 or other junction. One leg of the junction 146 may be connected to an air vent means 148 to provide a rapid return of air pressure in the line 142 to atmospheric pressure. This is very useful, for example, when it is desired to change the pressure in the chamber 18 from a negative to a positive pressure to empty fluid in the chamber into the receiving container 24. In the preferred embodiment of the invention, the air vent means 148 consists of a conduit 150 having one end open to the environment. A solenoid valve 152 is attached to the end open to the environment to selectively open and close conduit 150 in response to signals from the control means as will be discussed more fully below. This feature is more clearly illustrated in FIG. 12.

In the preferred embodiment of the invention, the flexible tubing 134 is connected to the pressure conduit 26 with a luer connection device. Other methods of connecting the flexible tubing 134 to the pressure conduit would be obvious to those skilled in the art based on the teachings herein.

Figure 13:
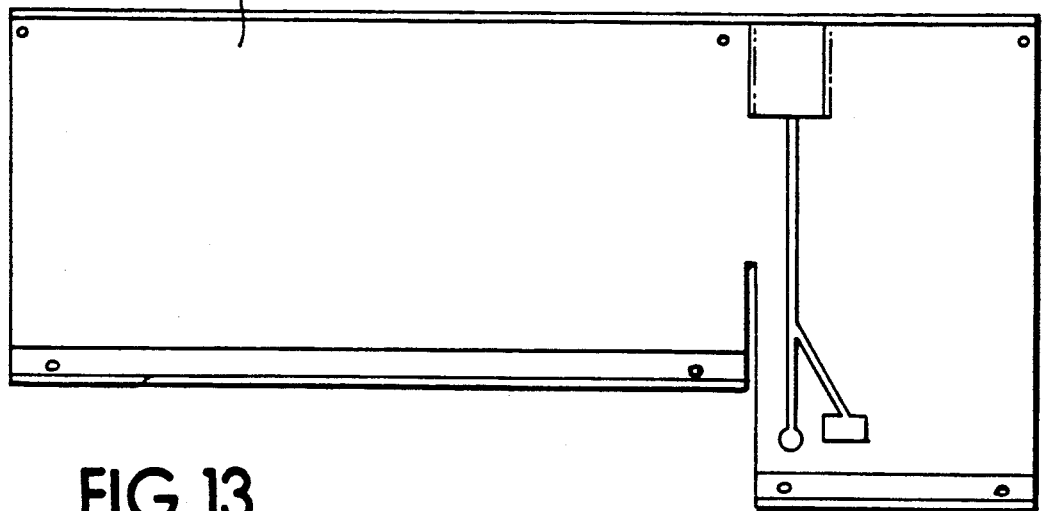
FIG. 13 is a top view of the base plate of the housing in the preferred embodiment of the invention.
Figure 14:
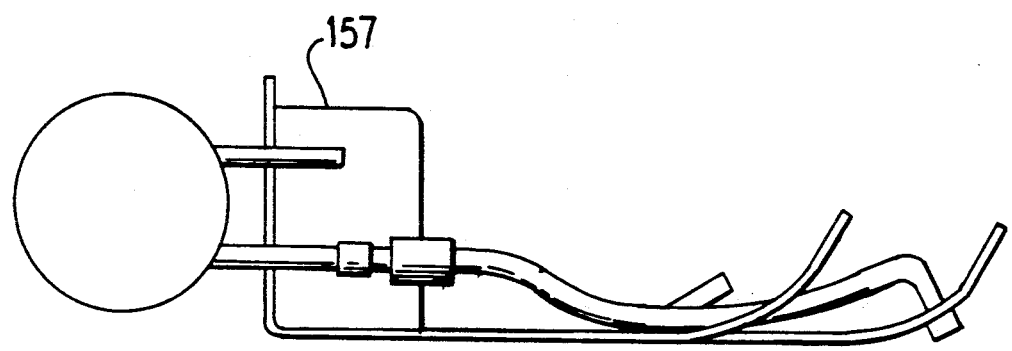
FIG. 14 is a side view of the base plate of FIG. 13.

In one embodiment of the invention, the device 10 may include first and second housings. A first housing 155 (FIG. 13) may house the control means, while a second housing 157 (FIG. 14) may house the pumping means of the first occluder and its associated tubing. The second housing may be readily removed in the preferred embodiment of the invention to replace the first portion 140 of tubing as required.

G. Load Cell

Figure 16:
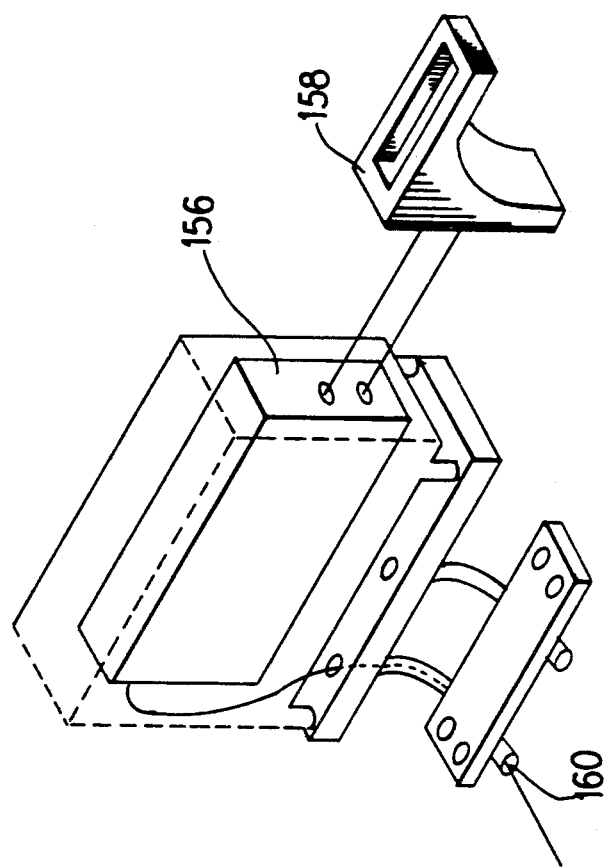
FIG. 16 is a partially exploded view of the mechanical design of the load cell assembly in the preferred embodiment of the invention.

The device 10 also includes a sensing means 20 for sensing the amount of fluid in the chamber 18 during operation of the device and for generating weight signals relating to the amount of fluid in the chamber. In the preferred embodiment of the invention, the sensing means consists of a load cell in contact with the chamber. The details of the mechanical features of the load cell are more clearly illustrated in FIGS. 16 and 17. Referring now to FIG. 16, a load cell 156 is connected to a chamber support 158. The chamber support 158 receives the chamber 18. The load cell 156 senses the weight of the chamber and generates weight signals which are indicative of the amount of fluid in the chamber. The electronics of the load cell are discussed in greater detail below in conjunction with a discussion of the control means. These signals pass through line 160 to the control means.

Figure 17:
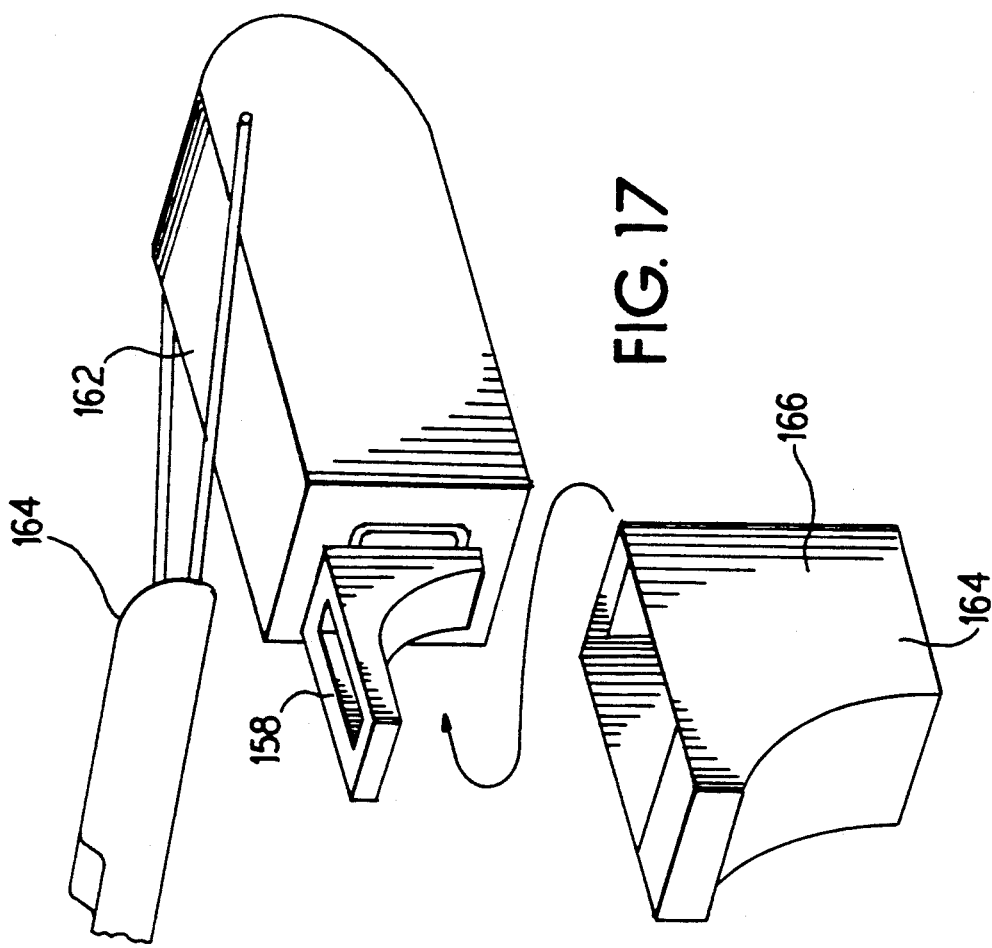
FIG. 17 is a perspective view of the housing covering the load cell of FIG. 16.

In the preferred embodiment of the invention, the load cell 156 is enclosed is a housing 162 as illustrated in FIG. 17. As can be seen in FIG. 17, the chamber support means 158 extends outside of the load cell housing. A chamber housing 164 is also provided in the preferred embodiment of the invention to protect the chamber and the load cell from variations in load cell readings due to laminar air flow present around the device 10. The chamber housing 164 also prevents unnecessary touch interference with the chamber. The chamber housing consists of a lower portion 166 which is mounted on the load cell housing 162. The lower portion 166 may be removed periodically to wash the housing. However, it is not necessary to remove the lower portion of the housing to insert a chamber 18 into the chamber support means 158. The upper portion 164 of the chamber housing in the preferred embodiment is a hinged lid which is attached to the load cell housing 162.

H. Hanger System

Figure 18:
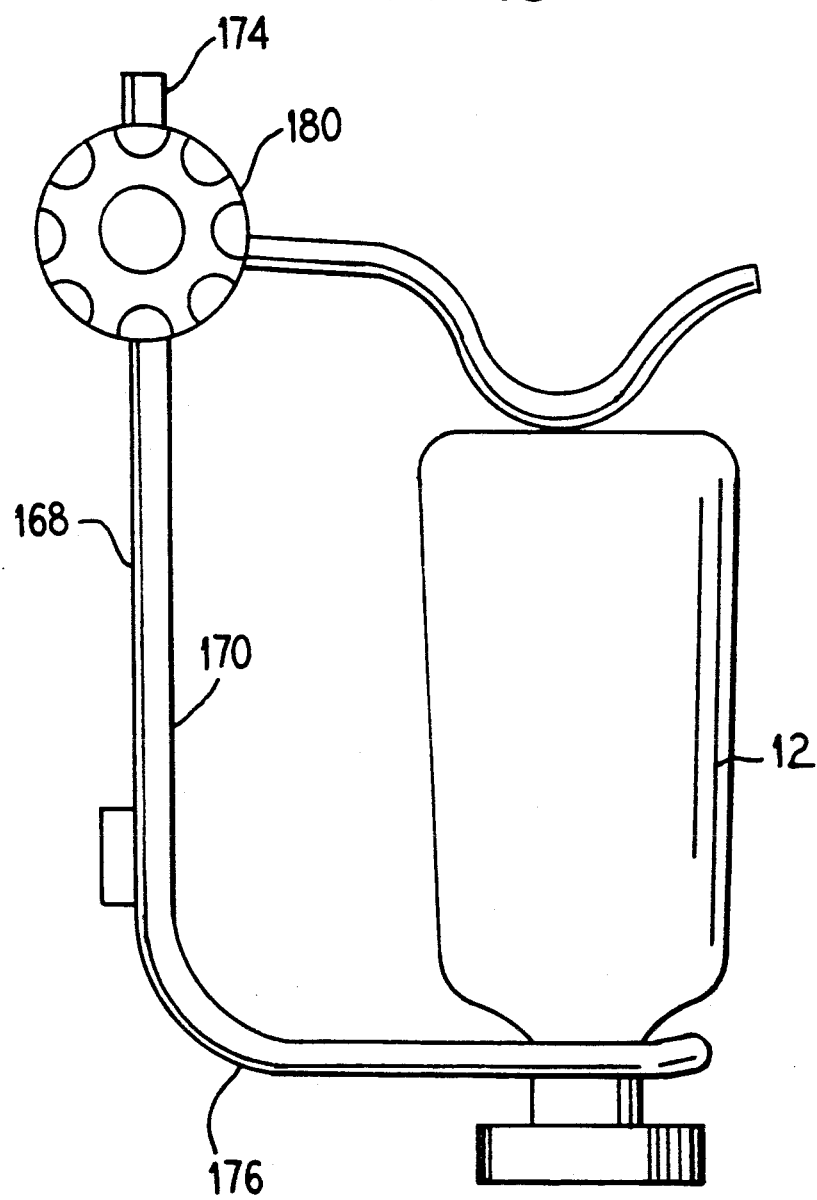
FIG. 18 is a side view of an individual source container hanger.
Figure 19:
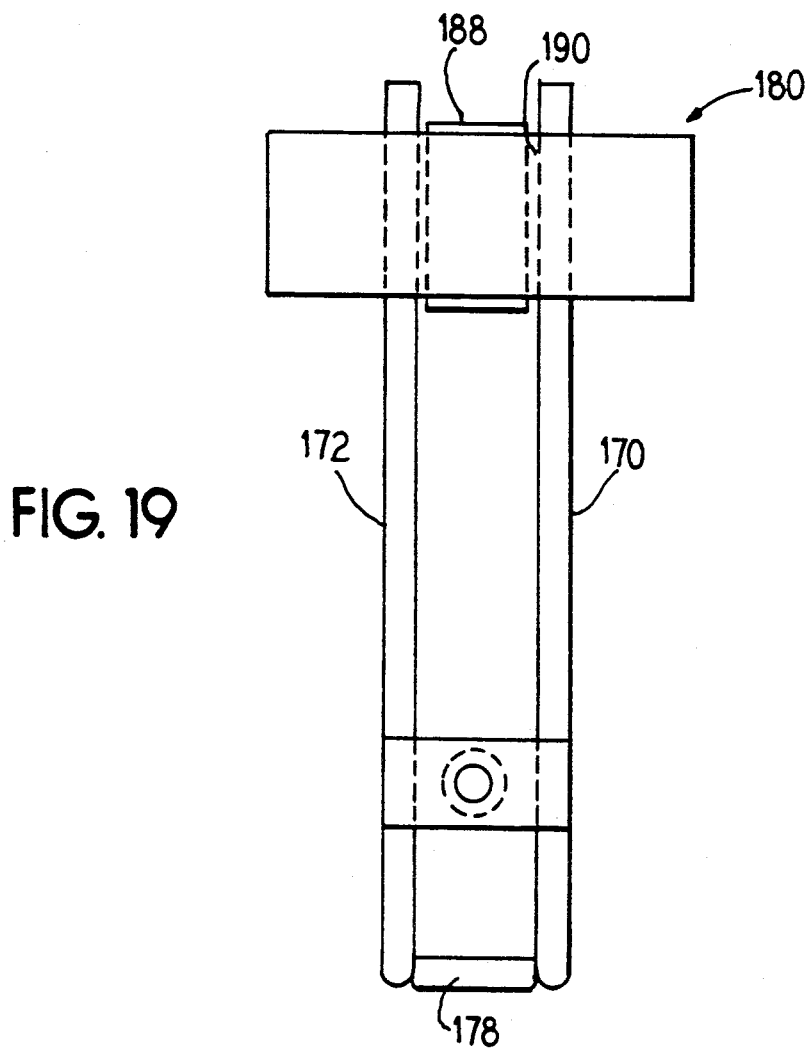
FIG. 19 is a rear view of the hanger of FIG. 18 without a source contianer.
Figure 20:
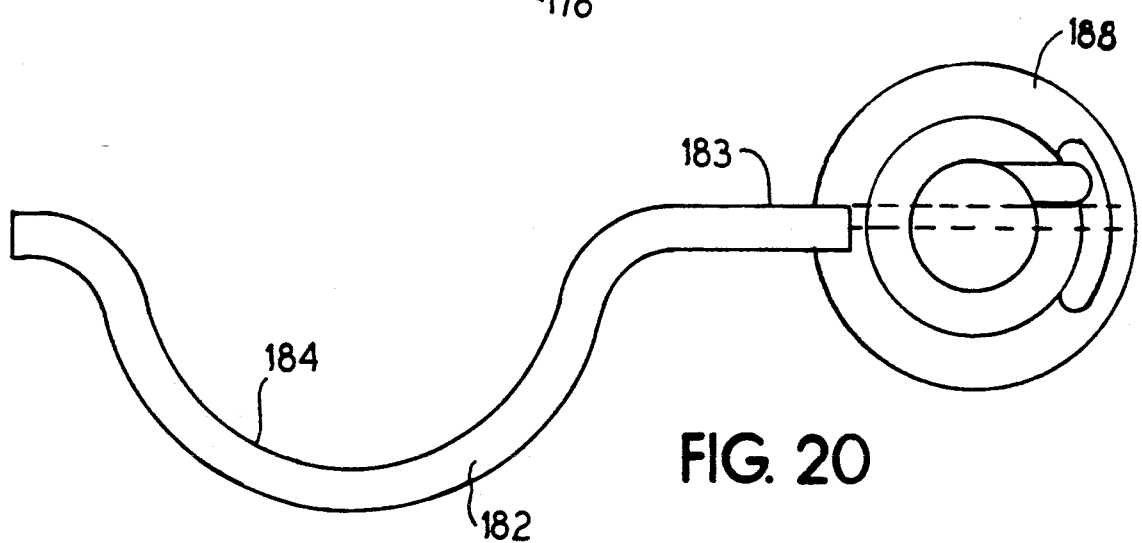
FIG. 20 is a cross-sectional view of a spring mechanism used in the preferred embodiment of the invention.
Figure 21:
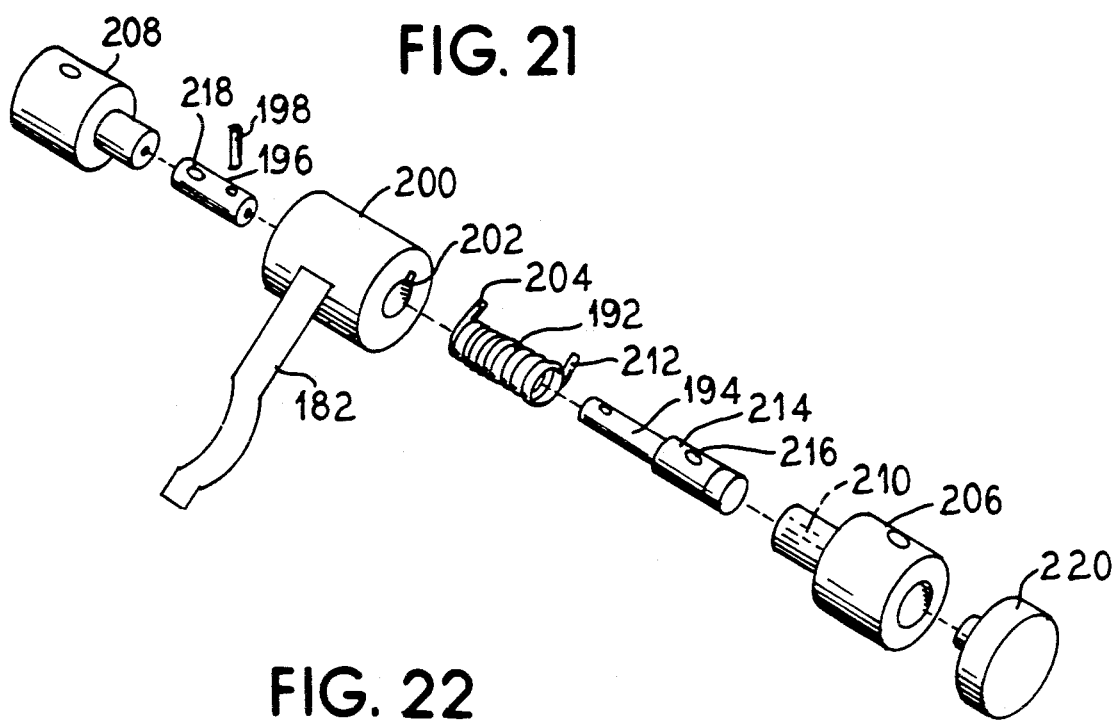
FIG. 21 is an exploded perspective view of the spring mechanism of FIG. 20.

In the preferred embodiment of the invention, each of the individual source containers 12 is maintained in position by a unique hanger system 168. The hanger system includes a pair of hooks 170 and 172 as can be seen in FIG. 19. These hooks are maintained in a parallel, spaced-apart relationship with one another to provide a means for holding each source container 12 in an inverted position. Each of the hooks generally includes a first vertically extending portion 174 (FIG. 18) and a second generally perpendicularly extending portion 176 which extends from the lower end of the vertically extending portion. Each pair of hooks 170 and 172 is maintained in a spaced-apart relationship with one another through the use of a spacer bar 178 and an adjustable spring means 180. The spring means 180 can be moved vertically along the first vertical portion 174 of the hooks to provide a downward pressure on each individual source container 12. Since various source containers may have greatly different sizes, the spring means 180 provides a method of adjusting to the various sizes of the source containers while 20 providing a consistent pressure on each container to immobilize each source container 12 during operation of the device. As can be seen in FIGS. 20 and 21, each spring means includes a spring hook 182. Each spring hook includes a first generally semicircular portion 184 which contacts the base of a source container 12 when the source container is in the inverted position on hooks 170 and 172. The spring hook 182 also includes a second generally rigid arm 186 which extends between the semicircular portion 184 and a torsion device 188. The torsion device is enclosed in a housing 190 which is situated between the vertical portion 174 of each pair of hooks 170 and 172 (FIG. 19).

Referring now to FIG. 21, the torsion means includes a torsion spring 192. The torsion spring is mounted on a shaft 194. The shaft is then connected to a shaft end cap 196 and maintained in a fixed relationship to the shaft end cap with a pin 198. The assembled spring, shaft and shaft end cap are then inserted through a cylindrical housing 200. The housing includes a keyway means 202 to receive one end 204 of the spring 192. The assembly is maintained in the housing through the use of first and second retainer bushings 206 and 208. One retainer bushing 206 also includes a keyway 210 for receiving a second end 212 of the spring 192. Shaft 194 is integrally connected to a second shaft end cap 214. Both shaft and cap 214 and 196 include apertures 216 and 218 for receiving a first vertical portion 174 of each of a pair of hooks 170 and 172. Prior to placing the assembly illustrated in FIG. 1 over a pair of hooks, at least one of the retainer bushings 206 and 208 will be rotated with respect to the other retainer bushing at least 180 degrees to create a tension on spring 192. The keyways 202 and 210 in conjunction with spring 192 create a constant downward pressure on the spring hook 182 after the assembly illustrated in FIG. 21 is mounted on a pair of hooks 170 and 172. A key feature of the device illustrated in FIGS. 18-21 is that the assembly illustrated in FIG. 21 is slidably engaged with the vertical portions of each pair of hooks to adjust to source containers of varying sizes. After the assembly illustrated in FIG. 21 has been mounted on a pair of hooks in the appropriate position, a locking knob 220 can be used to lock the assembly in a fixed position over a source container.

OPERATION OF THE DEVICE

A. Overview

The operation of the device 10 is described in greater detail in the following description. After a transfer set has been installed in the device, the operator is then ready to program the device to indicate the amount and type of each fluid to be transferred from each of the individual source containers into the receiving container. Information can be input into the device from one of two sources. One source of entering information into the device is a keyboard entry device, illustrated in FIG. 22. Another method of entering information into the device is through a computer terminal. The method of entering information into the device using the keyboard display will be described more fully below. As will be apparent to one skilled in the art based on the description given below, a very similar system would be used to input information into the device using a personal computer.

B. Power Up-Master Microprocessor

Figure 23:
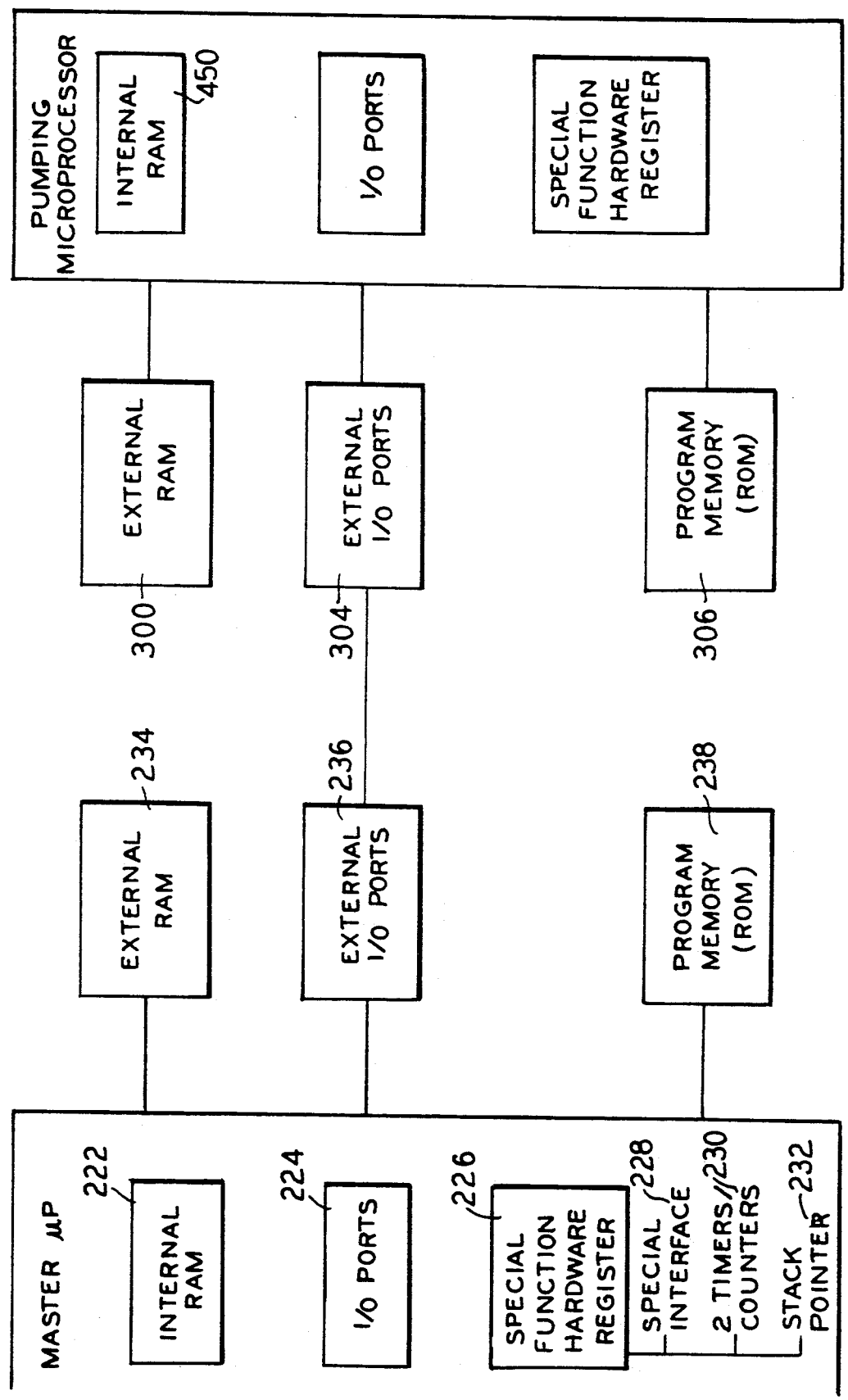
FIG. 23 is a simplified block diagram of a pair of microprocessors used in the preferred embodiment of the invention.

When the device is turned on, a system of internal checks is automatically performed by the control means 32. In the preferred embodiment of the invention, two microprocessors are used in the control means 32. While a variety of microprocessors can be used, in one embodiment of the invention, an Intel 8031 microprocessor can be used for both of the microprocessors. One microprocessor serves as a master microprocessor and another microprocessor serves as a pumping control microprocessor. A simplified block diagram of a typical microprocessor is illustrated in FIG. 23. As can be seen in this figure, a typical microprocessor includes an internal random access memory 222 and a plurality of in/out (I/O) ports 224. The microprocessors include a variety of hardware registers which can be programmed to perform special functions. In the preferred embodiments of the subject invention, the special function hardware registers 226 may include serial interface registers 228, timer/counters 230, and a stack pointer 232. Each of these aspects of the microprocessor as used in the preferred embodiment of the subject invention will be discussed in greater detail below. In addition to the internal features of a typical microprocessor as briefly described above, additional external hardware is present in a typical microprocessor control device. For example, an external RAM 234, external in/out ports 236, and a programmable memory (ROM) 238 are required to allow a microprocessor to perform the desired functions in accordance with the invention.

Figure 24:
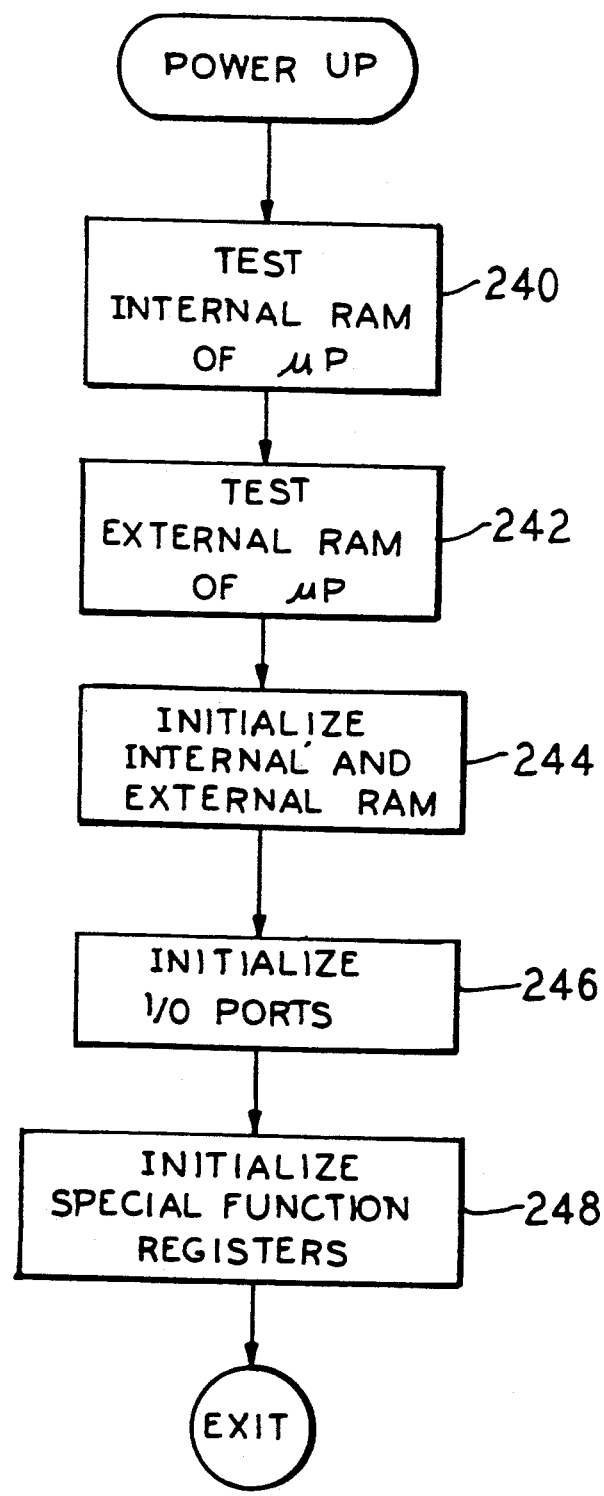
FIG. 24 is a flow chart of a "power-up" routine of the preferred embodiment of the invention.

During power up of the device, various diagnostics and other checks are performed simultaneously. These diagnostics are illustrated in the block diagram of FIG. 24. The diagnostics include: testing the internal RAM 222 of each microprocessor as shown by block 240; testing an external RAM 234 of each microprocessor as shown by block 242; initializing internal and external RAMs 222, 234 as shown by block 244; initializing all in/out ports 224 as shown by block 246; initializing special function hardware 226 located within the microprocessor (i.e. dedicate certain ports 228 for communication purposes, initializing the timer/counter 230 of each microprocessor, initializing the stack pointer for keeping track of program routines).

C. Keyboard Programming Mode

Figure 22:
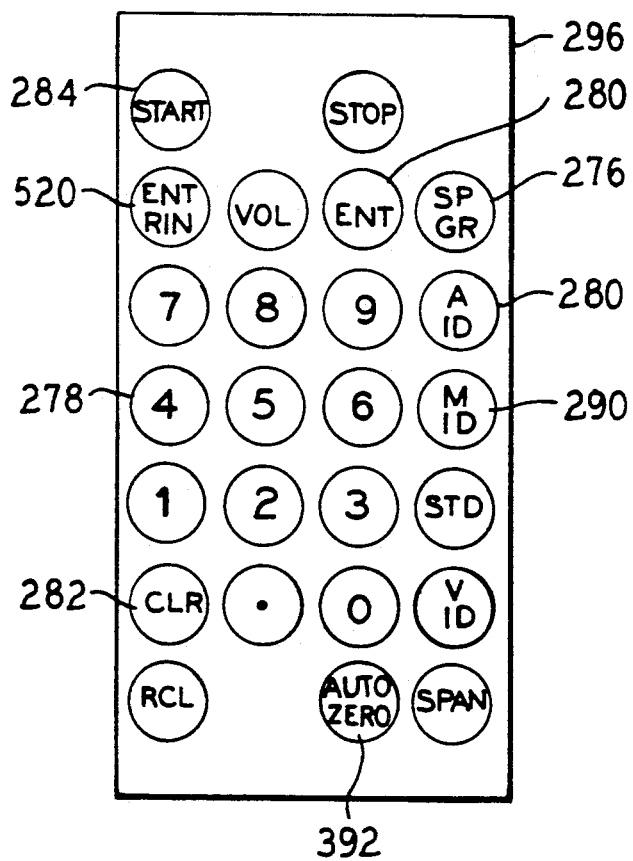
FIG. 22 is an illustration of a keyboard entry device.
Figure 26:
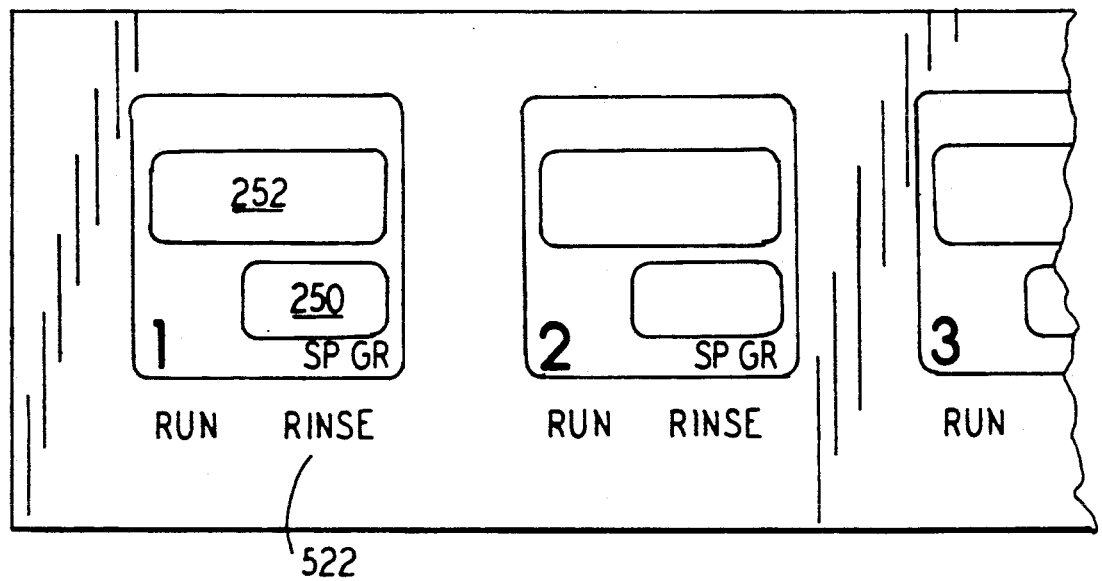
FIG. 26 illustrates a display panel for displaying specific gravity and volumetric information for each source container.

In the preferred embodiment of the subject invention, after initialization procedures and diagnostics are performed, the control device 32 automatically defaults to a keyboard programming mode. The keyboard programming mode is the mode in which an operator can input information into the device to cause the device to transfer specific amounts of fluid from specific individual source containers into the receiving container. FIG. 22 illustrates a display panel for for the keyboard entry device used in the preferred embodiment of the subject invention and FIG. 26 illustrates a display panel for displaying volumetric and specific gravity information for each source container. The display panel displays the specific gravity as programmed by an operator for a particular source container as illustrated by LCD display panel 250. The volume of fluid to be transferred from a specific source container to the receiving container as programmed by an operator is illustrated by another LCD display panel 252. Each individual source container has separate LCD display panels 250 and 252 for displaying the specific gravity and volumetric information for each source container.

Figure 27:
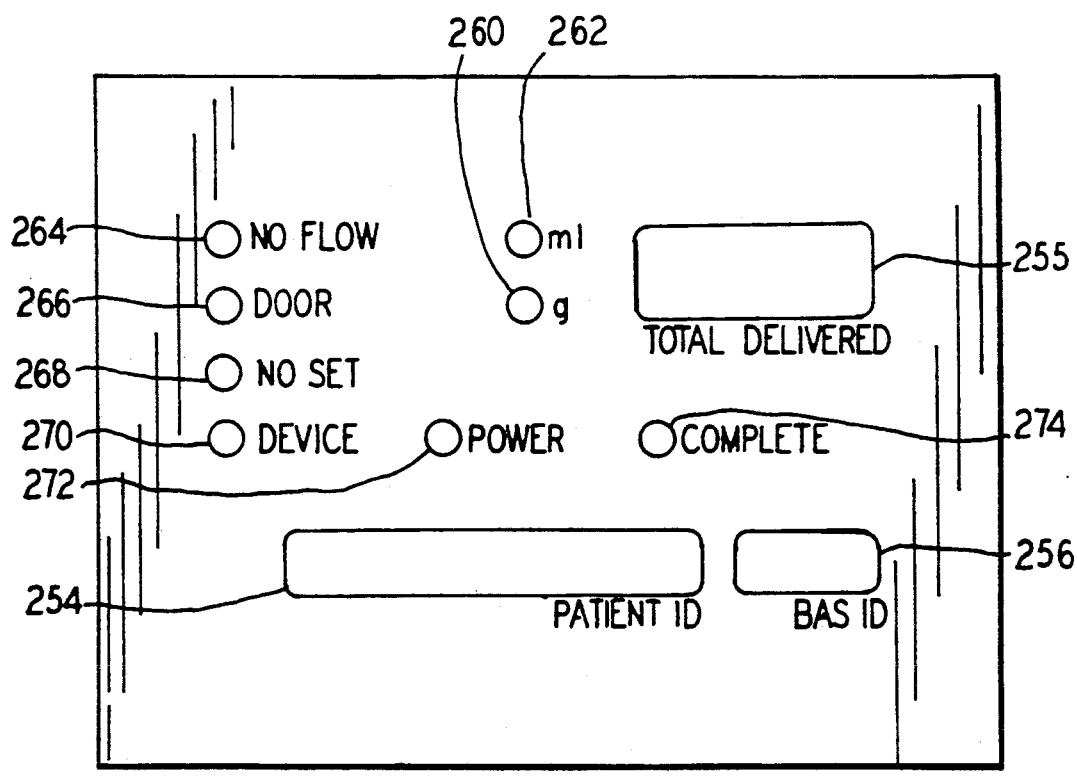
FIG. 27 illustrates a display panel for displaying status information during operation of the device.

FIG. 27 is an illustration of a display panel for displaying the status of the device during operation. Each of the displays illustrated in this figure will be discussed briefly here, and will be discussed in greater detail below with respect to actual operation of the device. Display panel 254 displays a patient I.D. number which is specific to each individual patient. This patient I.D. number can be entered into the device either through the keyboard entry device or a computer terminal. A unique identification number for each receiving container can be displayed in the bag I.D. display panel designated in 256 in FIG. 27. The "total delivered" display 258 can be used to display various types of information. For instance, during a keyboard programming mode, the "total delivered" display displays in grams the weight as sensed by the load cell 20. While the device is actually pumping, the "total delivered" display will display the volume in milliliters of any fluid transferred from the individual source containers. The circular "g" display 260 adjacent the "total delivered" display 258 will be lit during the keyboard entry mode to indicate that the information displayed in the "total delivered" display is in grams. Similarly, the "ml" display 262 will be lit while the device is pumping to indicate that the information displayed in the "total delivered" display is in milliliters.

Other status displays include:
1. a "no flow" display 264 which indicates that no fluid is flowing during operation of the device;
2. a "door" display 266 which indicates that a door is improperly closed during operation of the device;
3. a "no set" display 268 indicates that a set is not present, or is improperly positioned in the device during operation;
4. a "device" display 270 indicates a variety of device malfunction situations;
5. a "power" display 272 indicates when the device is receiving power, and a "complete" display 274 indicates when a pumping operation has been completed.

Figure 25:
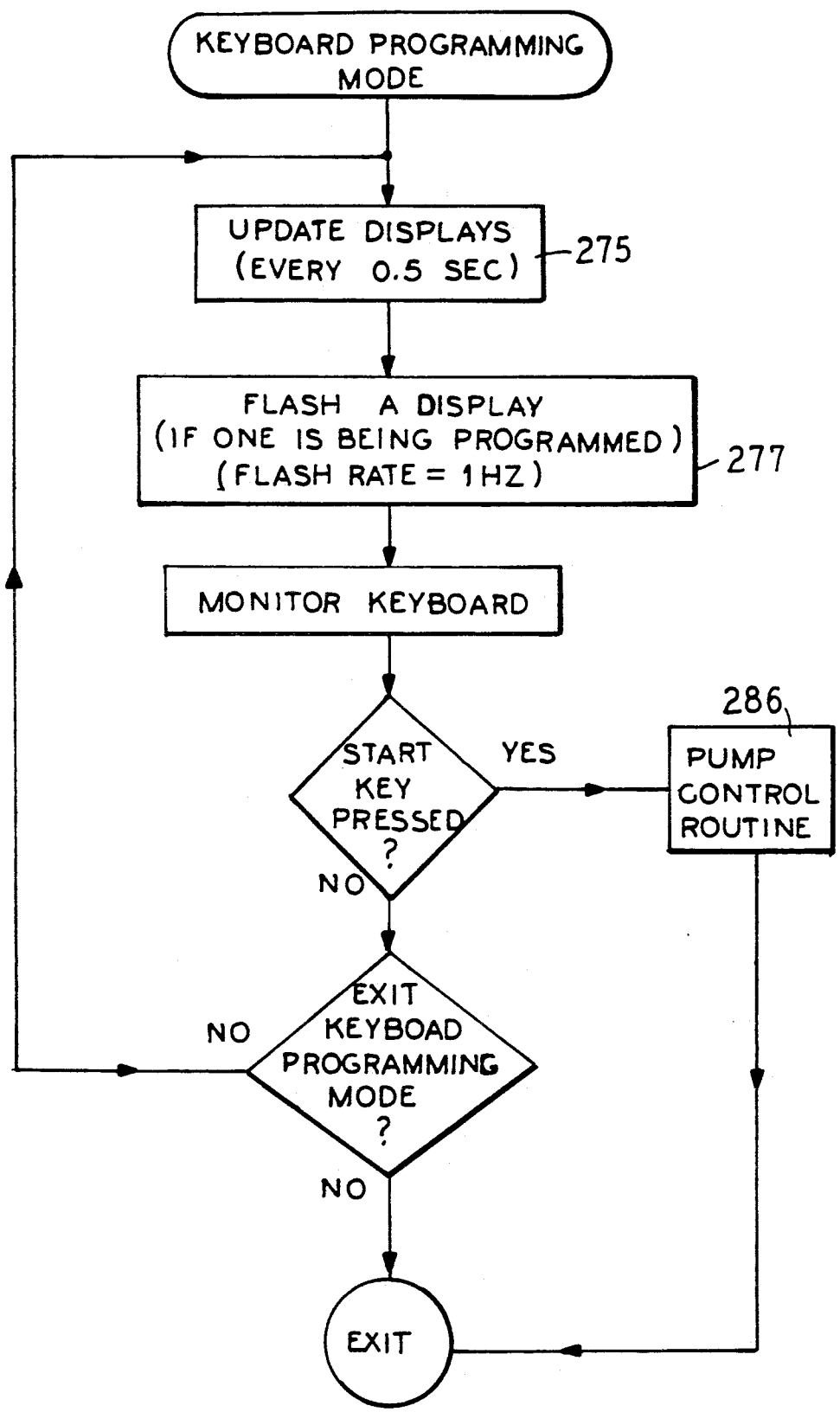
FIG. 25 is a flow chart illustrating the keyboard entry mode program.

The steps that an operator takes together with the internal functions performed by the control device in response to the operator's steps will now be discussed in greater detail. The master microprocessor operates during the keyboard programming mode as follows. First, as illustrated by block 275 in FIG. 25, the microprocessor generates an updated display every 0.5 seconds on the display panels illustrated in FIGS. 26 and 27. Next, as illustrated by block 277 in FIG. 25, a display for an individual source container such as displays 250 and 252 for source container no. 1 in FIG. 26 will be flashed to indicate to the operator that source container no. 1 can now be programmed. The "Run" LED will also be lit. Only one set of displays will be flashed at a time and one "Run" LED will be lit so that it will be clear to the operator which particular source container is currently being programmed.

The programmer may then use the keyboard illustrated in FIG. 22 to program the amount of fluid to be transferred from that particular source container to the receiving container. The programmer may either enter the volume or the specific gravity of the fluid to be transferred. Typically, during initial set up of the device, the specific gravity for each source container will be initially programmed by the operator.

In order to input information concerning the specific gravity of a particular source container into the device, the operator simply depresses the specific gravity key 276 illustrated in FIG. 22. This causes the keyboard programming mode to cause future information to be entered in a register programmed to retain specific gravity information. The programmer next may depress any one or more of the numeric keys 278 as displayed in FIG. 22 and depress the "enter key" 280 to have the information entered in the register discussed above.

If a programmer does not wish to have fluid transferred from that particular source container, and volumetric information has been previously entered in display panel 252, this information can be cleared simply by depressing the "clear" key 282. The operator may then go to the next source container display by depressing the "enter key" 280. The operator may continue pressing the "enter" key 280 until the display for the desired source container display begins flashing. When the desired source container display has been reached, the operator may then input information into the device for that particular source container in an identical manner to the manner described above for source container no. 1.

After the operator has completed entering information into the device for all the source containers, the operator may then press the start key 284. If the start key is depressed, the keyboard programming mode begins a pump control routine as illustrated by block 286 in FIG. 25. If the "start" key has not been depressed, the device remains in the keyboard programming mode unless the operator depresses either the "A ID" key 288, or the "M ID" key 290. The "A ID" key will cause the device to exit the keyboard programming mode, and enter an automatic identification programming mode which is controlled from a remote computer terminal. The "M ID" key will also cause the device to exit the keyboard programming mode and enter a manual identification programming mode, which is also controlled from a remote computer terminal.

D. Pump Control Routine

Figure 28A:
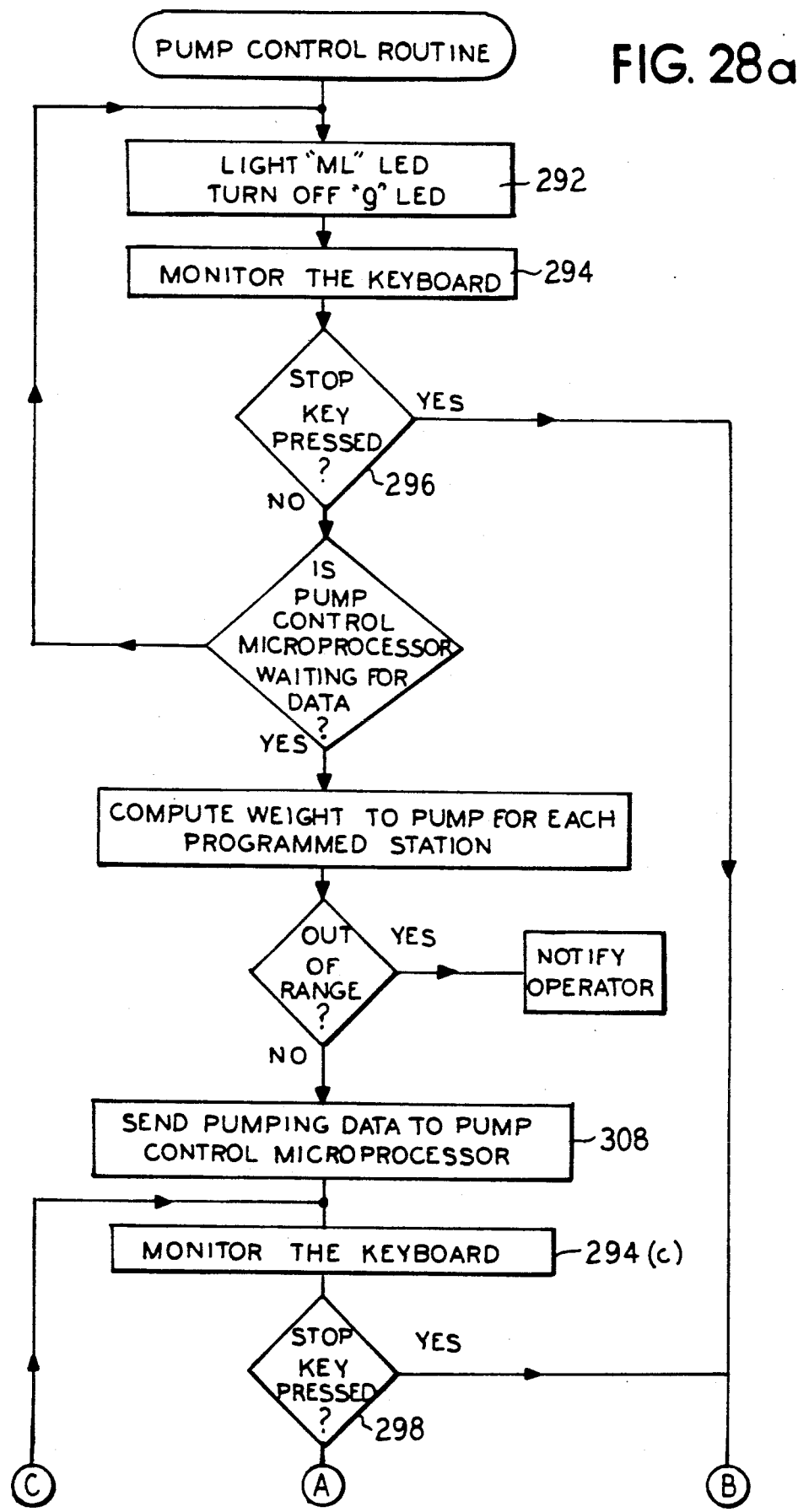
FIG. 28 is a flow chart illustrating a "pump control" routine of the referred embodiment of the invention.
Figure 28B:
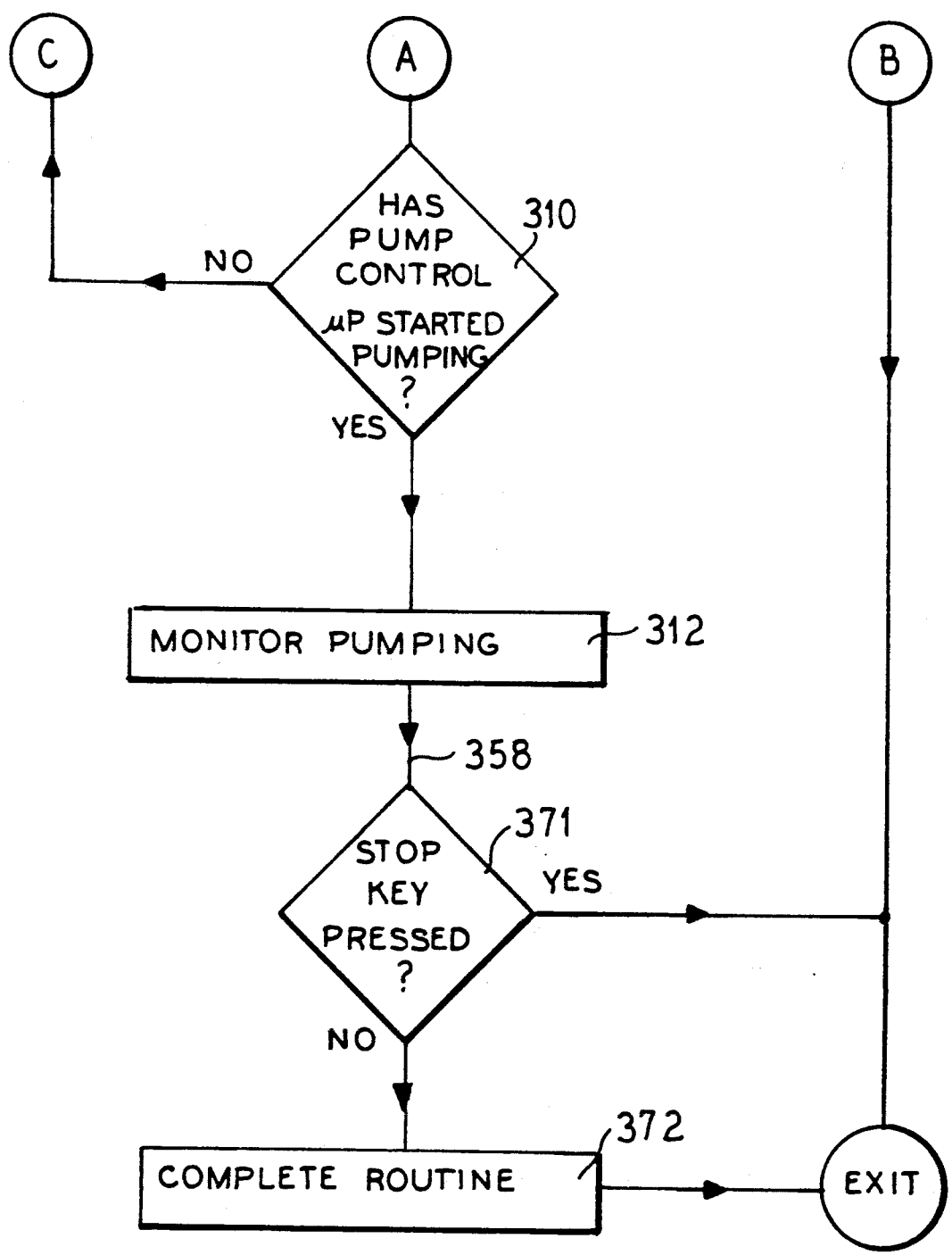
Figure 29A:
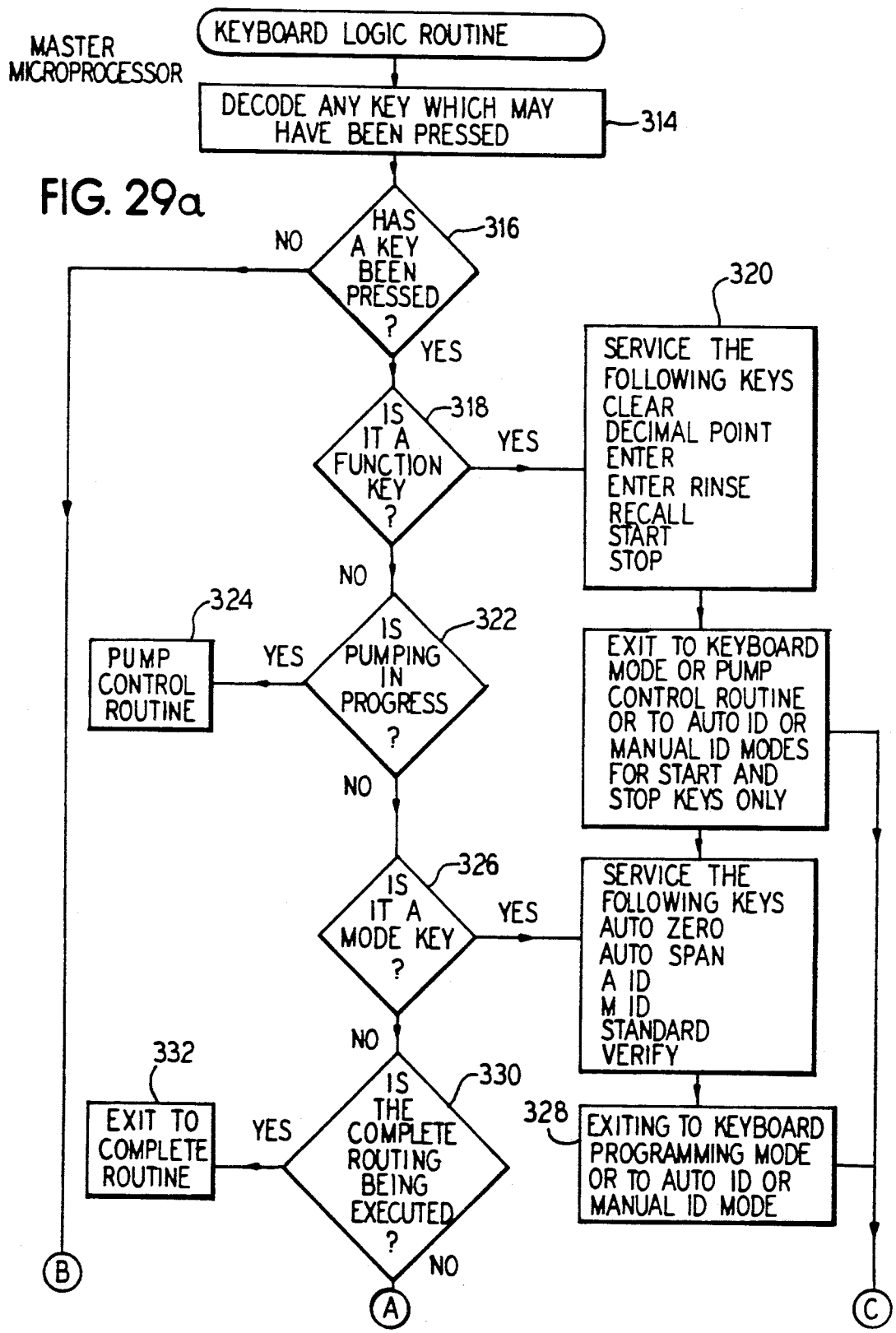
FIG. 29 is a flow chart illustrating a the "keyboard monitoring routine 38 of the preferred embodiment of the subject invention.
Figure 29B:
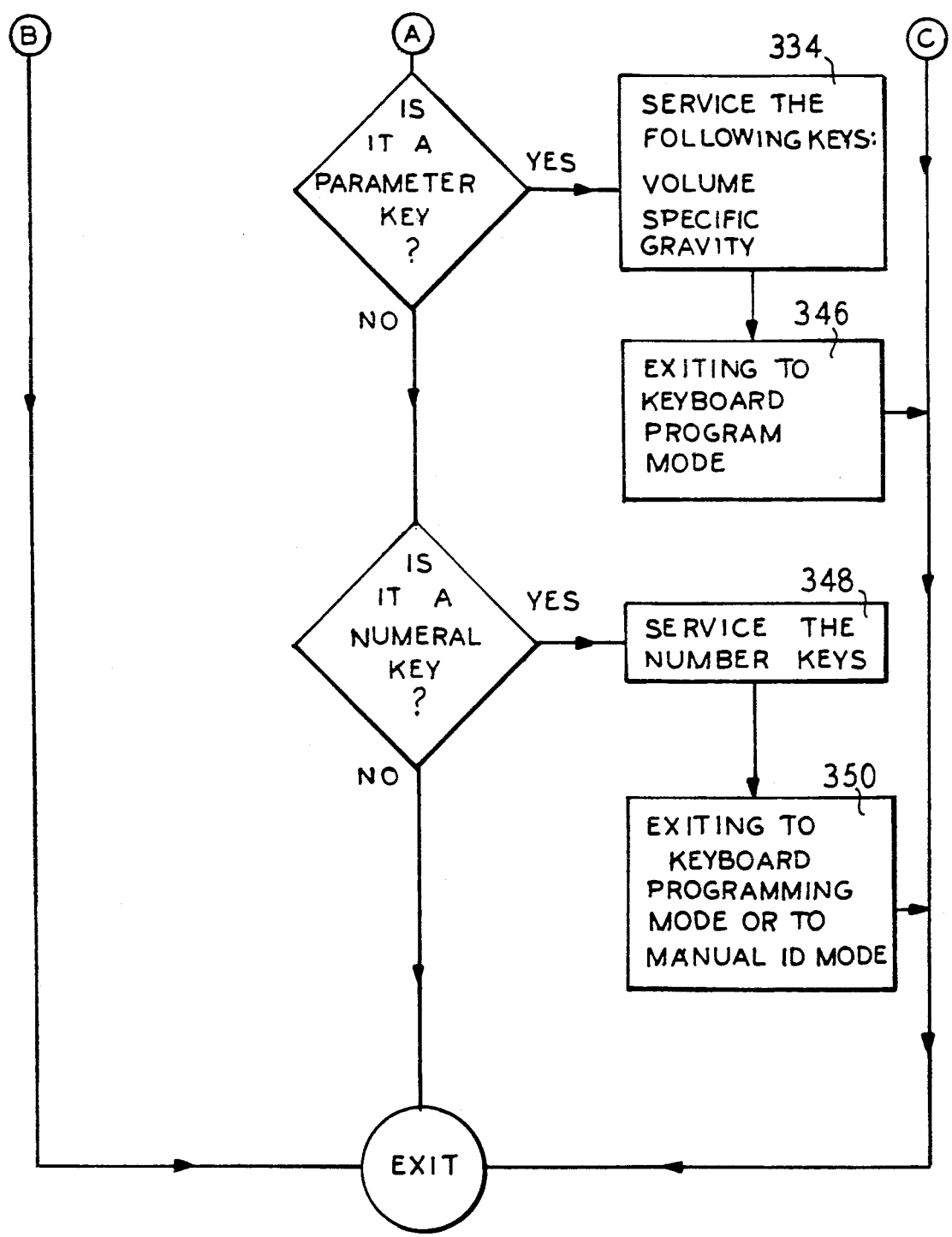

If the operator has depressed the start key, as discussed above, the device will enter a "pump control" routine. This routine is described in FIG. 28. As can be seen in the figure, the device first operates to cause the "ml" display 262 to light up, and turns off the light on the "g" display 260. This operation is illustrated by block 292 in FIG. 28. Next, the device continuously monitors the keyboard to determine if the operator has depressed any key on the pad during the pumping mode. This is illustrated by block 294 in FIG. 28. This monitoring function is described in greater detail in FIG. 29. If the operator has depressed the stop key 296 (FIG. 22), the pump control routine will automatically stop the pump control routine program as illustrated by block 298 (FIG. 28).

Assuming the stop key has not been depressed, the next function performed by the pump control routine is to check the status of the pump control microprocessor to determine if it is waiting to receive data. If the pump control microprocessor is ready to receive data, the master microprocessor computes the weight of fluid to be transferred from each individual source container to the receiving container given the volume and specific gravity information input in the device during the keyboard entry mode. This computation is essentially identical to the computations described in U.S. Pat. No. 4,513,796 entitled "High Speed Bulk Compounder" issued Apr. 30, 1985. This application is incorporated herein by reference. The pump control routine checks to see if any of the information entered by the operator is out of of a predetermined range. For instance, in the preferred embodiment of the invention, the allowable range for specific gravity is between approximately 0.5 and 3.0. The minimum volume to be transferred has to be, for example, at least one milliliter in the preferred embodiment of the invention. If any of the information is determined to be outside of these ranges, the pump control routine notifies the operator by causing the display 250 or 252 (FIG. 26) which is out of range to flash. This is illustrated by block 302 in FIG. 28.

After the out of range checks have been performed, if all information input into the device by the operator is within range, the pumping data computed by the program memory 238 and stored in its external RAM 234 is transferred through an external I/O ports 236 of the master microprocessor to the external I/O ports 304 of the pumping microprocessor. This information is then stored in the external RAM 300 of the pumping microprocessor to be later used by the program memory 306 of the pumping microprocessor. This transfer of information is illustrated by block 308 in FIG. 28.

After the information has been transferred to external RAM 300, the pump control routine then repeats the keyboard monitoring function discussed above with respect to block 294. The master microprocessor remains in this mode until it receives a signal from the pumping microprocessor indicating that the pump control microprocessor has started pumping. This is illustrated by decision diamond 310 in FIG. 28. If the pump control module has begun pumping, the master microprocessor begins a monitor pumping routine as illustrated by block 312 in FIG. 28.

E. Keyboard Logic Routine

Before discussing the monitor pumping routine in greater detail, the keyboard logic routine illustrated by block 294 and 294(a) in FIG. 28 will be discussed in greater detail. The keyboard logic routine is illustrated by the flow chart of FIG. 29. As can be seen in the flow chart, the first step performed in the routine is to decode any key which may have been pressed. This is illustrated by block 314 in the figure. If a key has been pressed as illustrated by decision diamond 316, the next step is to determine if it is a function key as illustrated by decision diamond 318. In the preferred embodiment of the invention, the following keys have been designated as function keys: (1) clear; (2) decimal point; (3) enter; (4) enter/rinse; (5) recall; (6) start; and (7) stop. If any of the above keys have been depressed, the program logic operates to perform the appropriate function (such as clear the designated display). This step is indicated by block 320 in FIG. 29. The program logic then operates to exit the keyboard logic routine and enter another appropriate routine, depending on which function key has been depressed, and depending on how information was originally entered into the device by the operator. For example, the program logic may exit to one of the following modes: (1) keyboard programming mode; (2) pump control routine; (3) auto identification routine; (4) manual identification routine. The program logic will enter the auto and manual identification routines only if the start or stop keys have been depressed.

If a function key has not been depressed as determined by decision diamond 138, the next step is to determine if pumping is in process. This is illustrated by decision diamond 322 in FIG. 29. If pumping is in progress, any other key entry made by an operator is ignored during pumping, and the keyboard logic routine is exited and the system logic will return to the location in the pump control routine from which it exited. This is illustrated by block 324 in FIG. 29.

If the device is not currently pumping fluid, then the keyboard logic routine will next check to see if a mode key has been depressed. This is illustrated by decision diamond 326. The following keys have been designated as mode keys in the preferred embodiment of the invention: (1) auto zero; (2) auto span; (3) A ID; (4) M ID; (5) standard; and (6) verify. If any of the mode keys have been depressed, the appropriate function will be performed and the program logic will cause the device to exit from the keyboard logic routine to either the keyboard programming mode, auto I.D. mode, or manual I.D. mode. This is illustrated by block 328 in FIG. 29.

If a mode key has not been depressed, the next step is to determine if a "complete routine" is being executed. This check is illustrated by decision diamond 330 in FIG. 29. The "complete routine" is simply a routine performed by the master microprocessor after pumping has been completed by the pumping microprocessor. In this routine, the master microprocessor waits for a signal from the pumping microprocessor to indicate that pumping has been completed. Once this signal is received, the master microprocessor causes the "complete" display 274 (FIG. 7.) to light up, and causes the program logic to wait for additional commands from the operator. If the complete routine is being exited as illustrated by decision diamond 330 in FIG. 29, the keyboard logic routine will cause the master microprocessor to exit the keyboard logic routine and enter the complete routine, as illustrated by block 332 in FIG. 29, thereby ignoring any keyboard entry made by the operator relating to volume, specific gravity, or numeric keys.

The next step performed by the keyboard logic routine, if the complete routine is not being executed is to determine if the operator has depressed a "parameter key". In the preferred embodiment of the invention, the volume and specific gravity keys 280 and 276, respectively, are designated as "parameter keys". If either of these keys has been depressed, the keyboard logic routine will cause the master microprocessor to perform the appropriate function indicated by either of these keys as illustrated by block 334 in FIG. 29, and then cause the master microprocessor to exit to the keyboard program routine as illustrated by block 346.

The next step performed by the keyboard logic routine is to determine if a numerical key has been depressed. If so, the appropriate function is serviced as illustrated by block 348, and the microprocessor exits to either the keyboard programming routine or the manual identification routine. This is illustrated by block 350.

F. Pump Monitoring Routine

The next routine to be described in greater detail is the pump monitoring routine illustrated in block 312 in FIG. 28.

A more detailed description of this block is provided in FIG. 30. The pump monitoring routine is a routine that is performed by the master microprocessor based on information that it receives from the pumping microprocessor. As can be seen in FIG. 30, the first function performed during the pump monitoring routine is to refresh all displays on the device every 0.5 seconds. This is illustrated by block 352. The pump monitoring routine then monitors the keyboard as illustrated by block 354. This function is the same function performed during the pump control routine and illustrated by block 294 and 294(a) in FIG. 8, and illustrated by the flow chart of FIG. 29. The next step performed by the pump monitoring routine is to check to see if the stop key has been depressed by the operator. This check is illustrated by decision diamond 356 in FIG. 30. It should be noted that when any key is depressed, the pump monitoring routine will enter the keyboard logic routine from block 354. If the keyboard logic routine determines that the stop key has been depressed, it will exit from the keyboard logic routine and return to the pump monitoring routine. The check illustrated by decision diamond 356 determines if the stop key has been depressed. If so, the pump monitoring routine will cause the microprocessor to exit the pump monitoring routine and go to a location designated as 358 in FIG. 28 of the pump control routine. This is illustrated by exit oval 360 in FIG. 30.

Returning to decision diamond 356 in the pump monitoring routine, if the stop key has not been depressed, the next function performed by the pump monitoring routine is to determine if an alarm condition is present. This is indicated by block 362 of FIG. 30.

If an alarm condition is present, the program logic of the pump monitoring routine will cause the master microprocessor to exit the pump monitoring routine and enter an alarm routine as illustrated by exit oval 364.

If an alarm condition is not present, the next function performed by the pump monitoring routine is to update the weight delivered for the station being pumped, and to update the total volume pumped in the total volume display. These functions are illustrated by block 366. After the update function has occurred, the next step is to determine if all stations have been pumped. This is illustrated by block 368 in FIG. 30.

If all stations have not been pumped, the program logic causes the pump monitoring routine to return to a location designated as location 370 in the pump monitoring routine.

If all stations have been pumped, the pump monitoring routine will cause the master microprocessor to exit to location 358 in FIG. 28 of the pump control routine.

The next function performed in the pump control routine is to once again check to see if the stop key has been depressed. This is illustrated by decision diamond 371 in FIG. 28.

G. Complete Rountine

Figure 31:
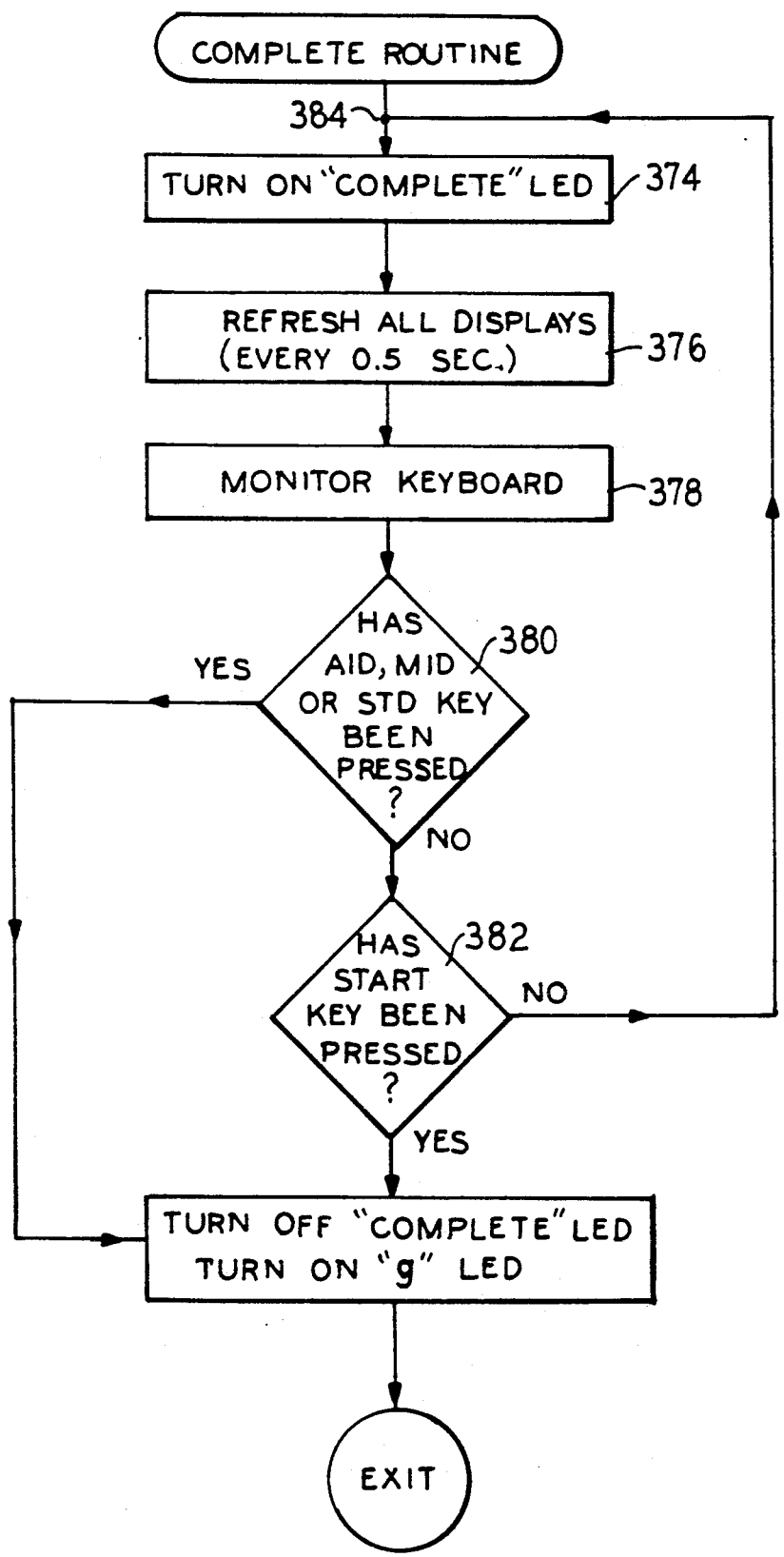
FIG. 31 is a flow chart illustrating a "complete" routine of the preferred embodiment of the invention.

If the stop key has been depressed, the pump control routine will exit to the keyboard programming routine. If the stop key has not been depressed, the pump control routine will then cause the master microprocessor to begin the complete routine. This is illustrated by block 372 in FIG. 28. The complete routine is also illustrated in greater detail in FIG. 31. The first function performed by the complete routine is to cause the complete LED 274 (FIG. 27) to light up. This function is illustrated by block 374 in FIG. 31. Next, all displays are refreshed every 0.5 seconds. This is illustrated by block 376. The keyboard is then monitored as illustrated by block 378. The keyboard monitoring function is the same routine discussed above, and illustrated in FIG. 29.

Next, the complete routine checks to see if the "A ID", "M ID" or standard keys have been depressed by the operator. This is illustrated by decision diamond 380. If any of these keys have been depressed, the complete routine will cause the master microprocessor to enter an appropriate routine related to that particular key through a master control routine.

If an "A ID", "M ID", standard, or stop key has not been depressed, the next function performed by the complete routine is to determine if the "start" key has been depressed by the operator. This is illustrated by decision diamond 382. If the start key has not been depressed, the complete routine returns to the location designated as 384 in FIG. 31. If the start key has been depressed, the complete routine operates to turn off the "complete" LED 274 (FIGS. 27), and to turn on the "g" LED 260. The master microprocessor then exits the complete routine.

H. Pumping Microprocessor

All of the control logic discussed above is performed by the master microprocessor in the preferred embodiment of the invention. The functions of pumping microprocessor will now be discussed in greater detail. The three major functions performed by the pumping microprocessor are to: (1) control the pumping operation of the peristaltic pump; (2) process signals generated by the load cell; and (3) control the occlusion means. When the device is originally turned on by an operator, the pumping microprocessor goes through an initialization process very similar to the initialization process discussed above with respect to FIG. 24.

I. Hold Routine

Figure 32:
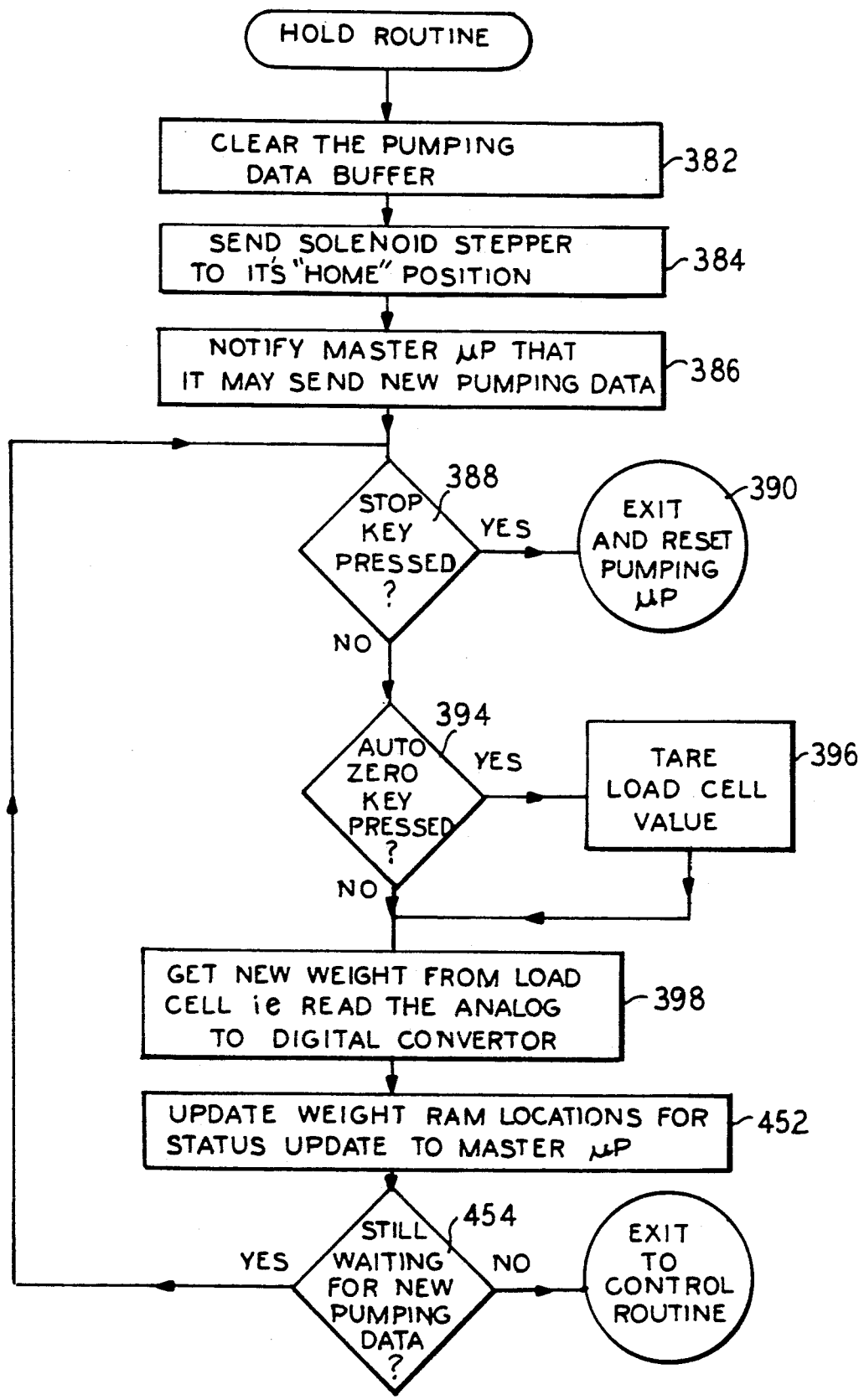
FIG. 32 is a flow chart illustrating a "hold" routine used by a pumping microprocessor in the preferred embodiment of the invention.

After the initialization process has been completed, the pumping microprocessor automatically goes into a hold routine that is illustrated in detail by the flow chart of FIG. 32. As can be seen in the figure, the first step performed by the hold routine is to clear any pumping data that may be present in a buffer in external RAM 300 of the pumping microprocessor. This step is illustrated by block 382 in FIG. 32.

After this step has been completed, the next function performed by the hold routine is to send a signal to motor 105 of the first occlusion means 28 of FIG. 8. This signal causes the motor to advance solenoid 108 to a "home position". In the preferred embodiment of the invention, the "home position" is a position in which the solenoid is immediately adjacent the occluding arm 90, which is closest to the motor 105. However, the "home position" may be located elsewhere on the drive screw 102. The purpose of having a "home position" is to enable the microprocessor to send future signals to the motor 105 to advance the solenoid to other designated positions from a base, or "home position". The step of sending the solenoid to its "home position" is illustrated by block 384 in FIG. 32.

After the solenoid has been placed in its "home position", the next function performed by the pumping microprocessor during the hold routine is to notify the master microprocessor that it may send new pumping data to the pumping microprocessor. This function is illustrated by block 386 in FIG. 32. As will be recalled, during the pump control routine discussed above with respect to FIG. 28, the master microprocessor will not send pumping data to the pumping control microprocessor until the master microprocessor receives a signal which indicates the pumping microprocessor is ready to receive data. The pumping data is then sent by the master microprocessor to the pumping microprocessor as illustrated by block 308 in FIG. 28.

After the pumping microprocessor has notified the master microprocessor that it may send new pumping data, the next function performed by the hold routine is to perform a check to see if the "stop key" has been pressed by the operator. This check is illustrated by decision diamond 388 in FIG. 32.

If the stop key has been pressed, the pumping microprocessor will automatically exit from the hold routine and reset the pumping microprocessor. In other words, the pumping microprocessor will return to an initialization routine which is essentially identical to the initialization routine performed by the master microprocessor when power is initially applied to the microprocessor. This exit routine is illustrated by exit oval 390 in FIG. 32.

If the "stop key" has not been depressed, the next function performed by the hold routine is to perform a check to see if the "Auto 0" key 392 (FIG. 22) has been pressed. The purpose of the "Auto 0" key is to inform the pumping microprocessor that the operator has requested the total weight displayed in display panel 258 of FIG. 27 be set to zero. This can be used, for example, to cause the display 258 to give a zero reading when the chamber is empty, rather than give a reading which indicates a weight of the chamber. Therefore, if the "Auto 0" key 392 has been depressed as indicated by decision diamond 394, the hold program performs a tare load routine which subtracts the weight of the empty chamber from the displayed value in display panel 258 of FIG. 27. This function is illustrated by block 396 of FIG. 32.

Figure 33:
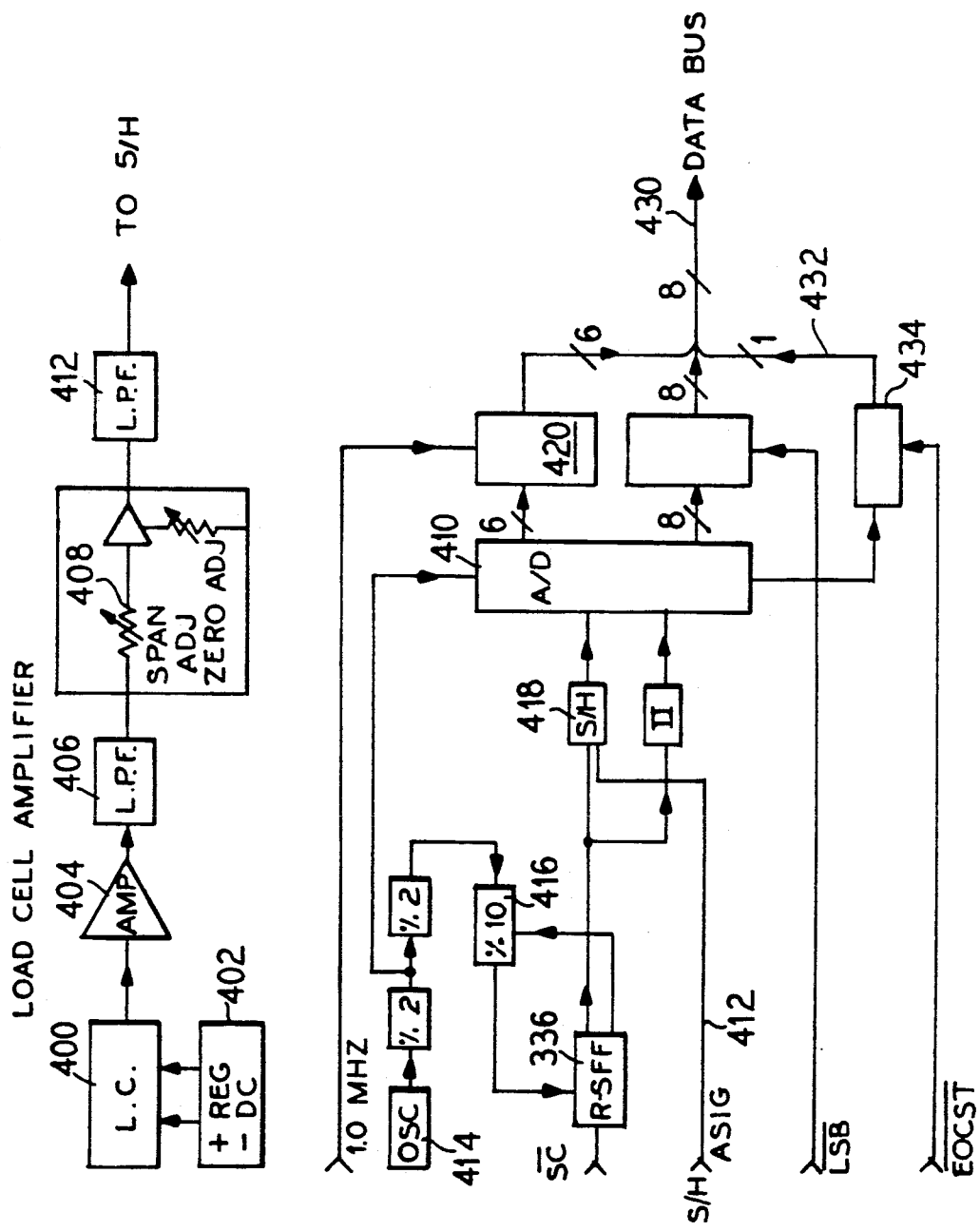
FIG. 33 is a block diagram of the electronics of a load-cell amplifier and A/D convertor of the preferred embodiment of the invention.

The next function performed by the hold routine is to obtain a new weight reading from the load cell. This function is illustrated by block 398 in FIG. 32. In order to more fully understand how this function is performed, the electronics used to generate signals from the load cell will now be discussed in greater detail. Refer now to FIG. 33 which is a block diagram of the electronics associated with the load cell of the preferred embodiment of the invention.

J. Load Cell

As can be seen in FIG. 33, a load cell 400 is powered by a regulated DC source 402. As discussed above, the chamber is suspended from a bracket on the load cell so that the load cell 400 generates an analog signal which is indicative of the weight of both the chamber and any fluid contained in the chamber. The load cell in the preferred embodiment of the invention, is a shear-beam type load cell based on resistance strain gauge technology. Weight values are converted by the load cell into DC signal voltages. These voltages, or signals, are fed into a linear amplifier 404. The signal generated by the load cell 400 is a relatively low level signal which requires amplification prior to transmission to an analog-to-digital converter. Linear amplifier 404 is a commercially packaged integrated circuit, low-noise, low-drift instrumentation amplifier. This instrumentation amplifier provides the bulk of amplification needed to bring the low level signal from the load cell to a level adequate for input into the A/D converter. The signal from amplifier 404 is then passed through a low-pass filter 406. This filter serves to attenuate noise components generate by semiconductors, seismic effects and load cell mechanical resonance. The signal is then passed from the low-pass filter 406 to a "span trim and zero adjust" stage 408. The span trim function of this stage is used to set the overall load cell amplifier gain (span) to a given millivolt/gram value required at the input to an A/D converter 410. The zero adjust function assures a unipolar signal input voltage to the A/D converter, which is configured in the unipolar mode. The signal is passed from the span trim and zero adjust stage to an additional low-pass filter 412. The function of low-pass filter 412 is essentially identical to the function of filter 406. The signal then passes to the A/D convertor 410 through line 412.

K. A/D Convertor

The signal is then passed through line 413 to sample/hold 418 which periodically locks the incoming signal from low-pass filter 412 to a stable value for conversion by A/D converter 410. The A/D conversion process is implemented by A/D converter 410 together with peripheral circuitry consisting of clock oscillator 414, sample pulse timer 416 and pulse generator 336. The A/D converter 410 converts the amplitude value of the signal from sample/hold 418 to an equivalent 14-bit binary coded output signal. This signal is transmitted through gates 420 and 422 which sequentially place a high data byte and then a low data byte on data bus lines 430 to the I/O port 304 of the pumping microprocessor. The information is then transmitted to a status buffer in internal RAM 450 of the pumping microprocessor. Gates 420 and 422 transmit data to the microprocessor after the microprocessor senses the end of conversion signal via line 432 which is transmitted from a multiplexing gate 434. After the low data byte has been transferred, the A/D conversion cycle is completed, and begins again with the arrival of the next pulse into a pulse generator 436.

L. Hold Routine—Continued

After an updated weight has been received from the load cell as illustrated by block 398 of FIG. 32, the next function performed by the pumping microprocessor is to update the internal RAM 222 of the master microprocessor with weight information contained in internal RAM 450 of the pumping microprocessor. This updating process takes place every four tenths of a second in the preferred embodiment of the invention. Therefore, the information displayed in the display panel 258 is updated continuously during the hold routine.

After the weight information has been sent to the master microprocessor as illustrated by block 452 of FIG. 32, the next function performed by the pumping microprocessor during the hold routine is to perform a check to see if the pumping microprocessor is still waiting for new pumping data. This check is illustrated by decision diamond 454. In the preferred embodiment of the invention, the master microprocessor only sends data to the pumping microprocessor when the operator has pressed the start button 284 (FIG. 22). When the start button is pressed, this means that the operator has completed entering pumping information for a specific patient. Once this information has been entered and the start button has been depressed, the master processor continues to send this information to the pumping microprocessor until the pumping microprocessor confirms that valid data has been sent to the pumping microprocessor. Once the pumping microprocessor has confirmed that valid data has been received from the master microprocessor, the pumping microprocessor exits from the hold routine of FIG. 32, and returns to a master control routine which will be discussed in greater detail below.

M. Pumping Routine

Figure 34:
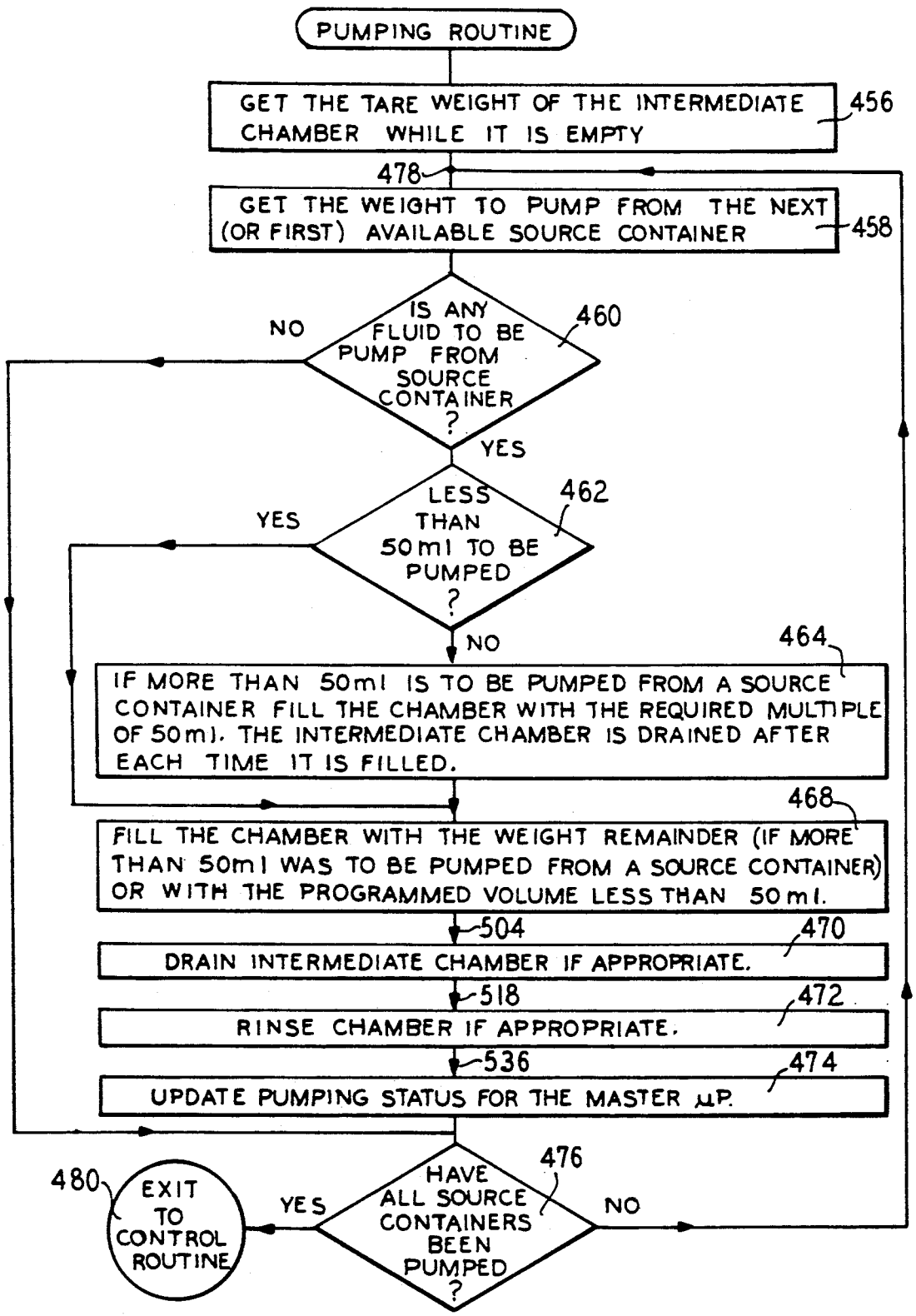
FIG. 34 is a flow chart illustrating a "pumping" routine used by a pumping microprocessor in the preferred embodiment of the invention.

The control routine will next cause the pumping microprocessor to enter into a pumping routine which is discussed in greater detail in FIG. 34. As can be seen in the figure by block 456, the first function performed by the pumping routine is to obtain a "tare weight" of the chamber 18 while it is empty. A tare weight is simply the weight of the empty chamber. After this information has been obtained, the tare weight is stored in a buffer in internal RAM 450 of the pumping microprocessor.

The next function performed by the pumping routine is to obtain a weight to pump from the first (or next) available source container. This function is illustrated by block 458 of FIG. 34. As discussed above, the weight information is stored in an external RAM 300 of the pumping microprocessor until it is transferred during the pumping routine to a buffer in the internal RAM 450 of the microprocessor.

After this information has been transferred, the next function performed by the pumping routine is to perform a check to see if any fluid is to be pumped from a source container. This check is illustrated by decision diamond 460 of FIG. 34.

If further pumping is required, the next step performed by the function routine is to perform a check to see if less than 50 milliliters needs to be pumped. This check is illustrated by decision diamond 462 of FIG. 34. If more than 50 milliliters is to be pumped from a source container, the intermediate chamber is filled an integral number of times as required to pump the closest integral multiple of 50 milliliters of the total volume of fluid to be pumped from a single source container. The reason this step is performed in the preferred embodiment of the invention is because the maximum capacity of the chamber is 50 ml. This function is illustrated by block 464 in FIG. 34.

If less than 50 ml. is to be pumped, or after the closest integral multiple has been pumped during the step discussed above, the next function performed by the pumping routine is to fill the chamber with any weight remaining to be pumped from that particular source container. This function is illustrated by block 468 in FIG. 34. In the preferred embodiment of the invention, the smallest weight of fluid to be pumped may be as low as 1 ml. However, in other embodiments of the invention, it may be possible to pump volumes as low as 0.5 ml. The fill functions illustrated by blocks 464 and 468 of FIG. 34 are discussed in much greater detail below with respect to FIG. 5.

The next function performed by the pumping routine is to drain the intermediate chamber if appropriate. This function is illustrated by block 470 and will be discussed in greater detail with respect to FIG. 36.

The next function performed by the pumping routine is to perform a rinse operation. This function is illustrated by block 472 of FIG. 34 and discussed in greater detail below with respect to FIG. 37.

After the chamber has been rinsed (if necessary), the next function performed by the pumping routine is to update the pumping status for the master microprocessor based on information from the load cell obtained during the pumping or rinsing operation. This function is illustrated by block 474 of FIG. 34.

The pumping routine then performs a check to see if fluid from all necessary source containers has been pumped. This check is illustrated by decision diamond 476 of FIG. 34. If fluid from all necessary source containers for a particular patient have not yet been pumped, the pumping routine returns to the location designated as 478 in FIG. 34 to obtain the weight to pump for the next required source container. If all necessary fluid has been pumped, the pumping routine then exits to a master control routine as illustrated by exit oval 480 in FIG. 34.

N. Fill Routine

Figure 35:
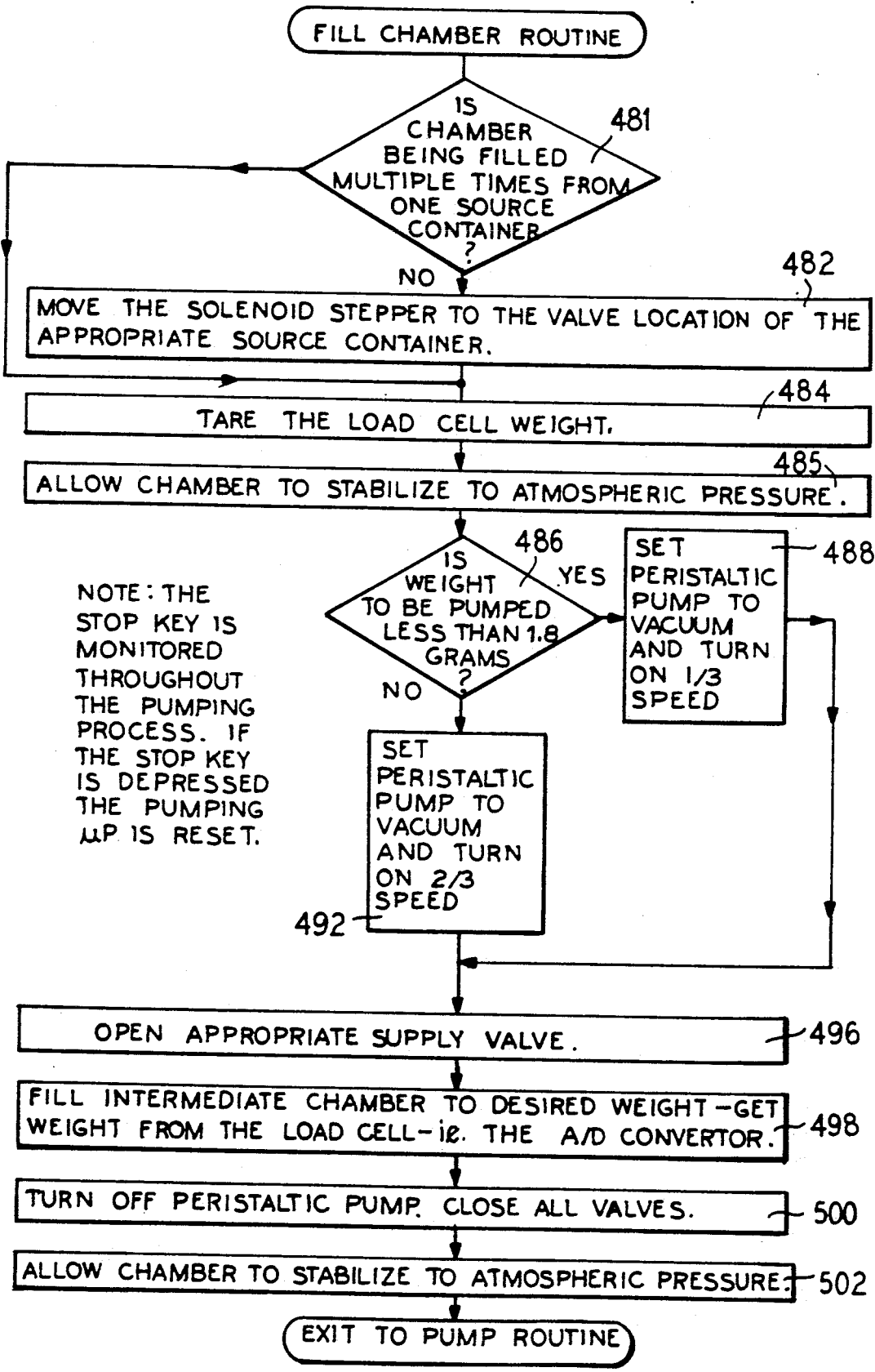
FIG. 35 is a flow chart illustrating a "fill" routine performed by the pumping microprocessor in the preferred embodiment of the invention.

The precise mechanism and procedures by which fluid is actually pumped from the source containers into the chamber by the control means as illustrated by blocks 464 and 468 of the pumping routine will now be discussed in greater detail with respect to FIG. 35. As can be seen in the figure, the first function performed during the "fill routine" of FIG. 35 is to perform a check to see if the chamber is to be filled a multiple number of times from a single source container adjacent the bias overcoming means 106 of the first occlusion means 28. This check is illustrated by decision diamond 481 in FIG. 35. If the bias overcoming means is not adjacent the appropriate occlusion arm 94, the appropriate source container, the pumping microprocessor sends a signal to motor 105 to advance carriage 104 to position the bias overcoming means 106 adjacent the appropriate occluding arm 90 of the appropriate source container 12. This function is illustrated by block 482.

The next function performed by the fill routine is to obtain a tare weight from the load cell for the chamber. This function is illustrated by block 484 in FIG. 35.

The next function performed by the fill chamber routine is to allow the chamber to stabilize to atmospheric pressure. This function is illustrated by block 485. The chamber can be quickly brought to atmospheric pressure in the preferred embodiment of the subject invention by allowing solenoid valve 152 in FIG. 12 to open to admit the pressure conduit, line 128, to suddenly go to atmospheric pressure. This in turn causes the pressure in the chamber to reach atmospheric pressure.

In the preferred embodiment of the invention, the next function performed by the fill chamber routine is to check to see if the weight to be pumped is less than 6.0 grams. This check is illustrated by decision diamond 486. If the weight to be pumped is less than 6.0 grams, the control means sends a signal to the peristaltic pump to cause the pump to rotate in a first direction to create a vacuum in the chamber. In the preferred embodiment of the invention, if the weight to be pumped is less than 6.0 grams, the control means causes the peristaltic pump to operate at one-third at its rated speed. This function is illustrated by block 488 in FIG. 35.

If the weight to be transferred is not less than 6.0 grams, the next function performed by the fill chamber routine, is to perform a check to see if the weight should be pumped is less than 11.0 grams. This check is illustrated by decision diamond 490 in FIG. 35. If the weight to be pumped is between 6.0 grams and 11.0 grams, the control means sends a signal to the peristaltic pump to cause the pump to rotate in the first direction to create a vacuum in the chamber. However, in this instance, the signal causes the pump to operate at two-thirds of its rated speed. This function is illustrated by block 492 of FIG. 35.

The next function performed by the fill chamber routine is to send a signal to the peristaltic pump to rotate in the first direction at full speed if the weight to be transferred is greater than or equal to 11.0 grams. This function is illustrated by block 494 in FIG. 35.

It should be noted that up to this point in the fill chamber routine, no fluid is actually being pumped into the chamber because the first occlusion means is biased so that all of the individual conduit lines are occluded. The next function performed by the fill chamber routine is to send a signal to solenoid 108 of the first occlusion means to cause rod 110 of the solenoid 108 to move into an extended position, thereby causing occluding arm 90 to move away from its associated individual fluid conduit 16 to allow fluid to flow from the appropriate source container into the chamber. The step of opening the appropriate supply valve is illustrated by block 496 in FIG. 35.

The next function performed by the fill routine is to allow the chamber to fill to the desired weight as the peristaltic pump creates a vacuum in the chamber to draw fluid from a single source container into the chamber. As fluid is being drawn into the chamber, the load cell is constantly generating an analog signal which is sent to the A/D convertor to create a digital signal which is then transmitted to the pumping microprocessor. This function is illustrated by block 498.

When the signal from the load cell indicates that the desired amount of fluid has been transferred to the chamber, the next function performed by the fill chamber routine is to turn off the peristaltic pump and de-energize solenoid 108 to prevent further fluid flow. This function is illustrated by block 500.

The next function performed by the fill routine is to once again allow the chamber to stabilize to atmospheric pressure. This function is illustrated by block 502, and is essentially identical to the function discussed above with respect to block 485. The pumping microprocessor then exits the fill routine and returns to the pumping routine at the location designated as element 504 in FIG. 34.

O. Drain Routine

Figure 36:
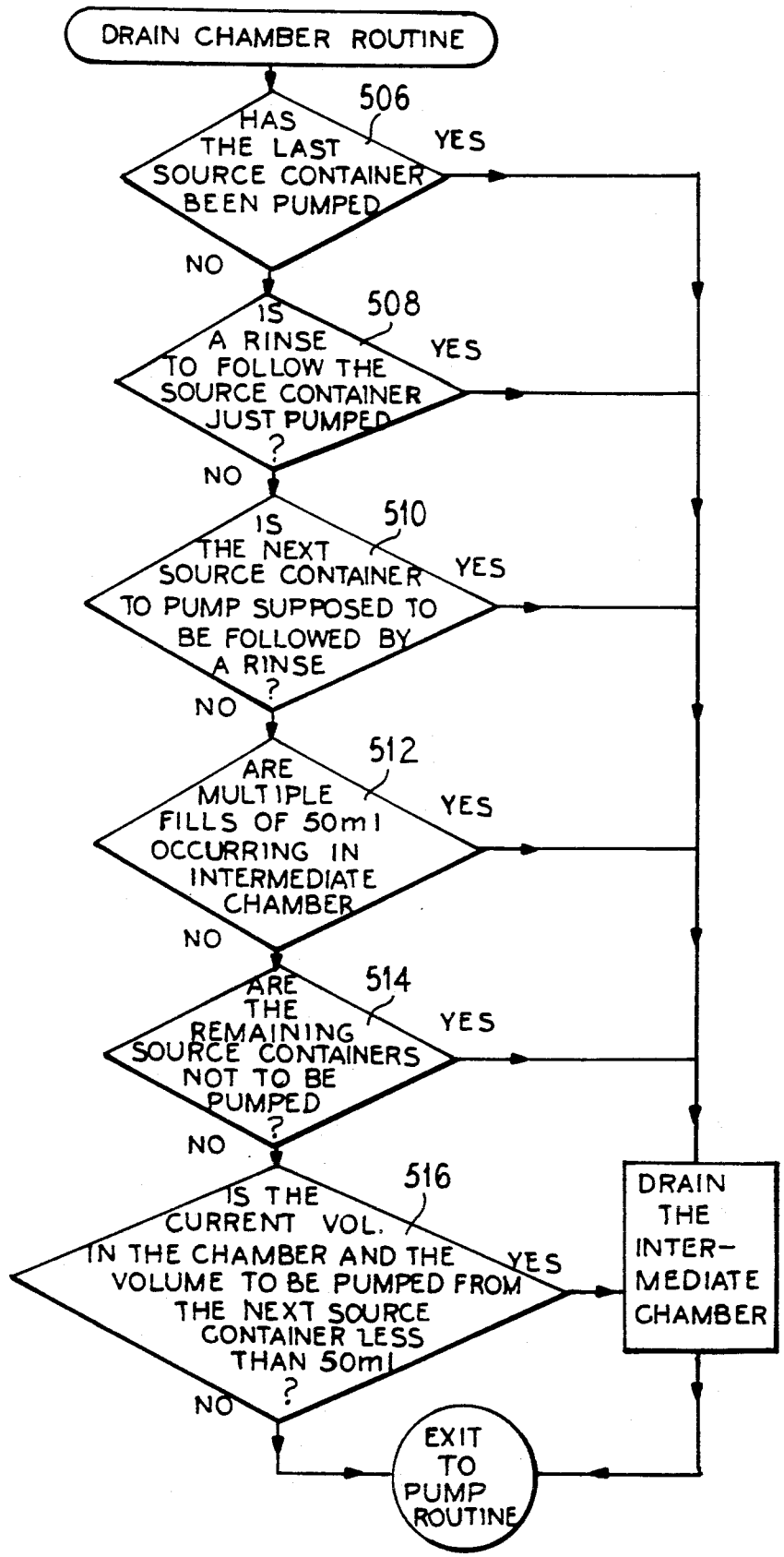
FIG. 36 is a flow chart illustrating a "drain" routine performed by the pumping microprocessor in the preferred embodiment of the invention.

The drain routine discussed above with respect to block 470 of FIG. 34 will now be discussed in greater detail below referring to FIG. 36. The drain routine is simply a series of checks to determine if the chamber needs to be drained. The first check performed by the drain routine is to determine if the last source container has been pumped. This check is illustrated by decision diamond 506 in FIG. 36. If the last source container has not been pumped, the drain routine next checks to see of a rinse is to follow the source container that was just pumped. This check is illustrated by decision diamond 508. Normally, a rinse will not be conducted unless the next fluid to be pumped is incompatible with the previous fluid, or if the previous fluid pumped was the last fluid to be pumped. The next check performed by the drain chamber routine is to determine if the next source container to be pumped is supposed to be followed by a rinse. This is illustrated by decision diamond 510. In the preferred embodiment of the invention, if the next source container is to be followed by a rinse, then a drain operation will occur prior to filling the chamber with that fluid.

The next check performed by the drain chamber routine is to determine if multiple fills of 50 mls are occurring in the intermediate chamber. This is illustrated by decision diamond 512. The next check performed by the drain chamber routine is to determine if all of the remaining source containers contain fluid which is not required to be pumped into the chamber for a particular patient. This check is illustrated by decision diamond 514.

The final check performed by the drain chamber routine is to determine if the current volume in the intermediate chamber and the volume to be pumped from the next source container is less than 50 mls. This is illustrated by decision diamond 516. If the volume in the chamber and the volume to be pumped from the next source container is less than 50 mls, the pumping microprocessor will return to the pumping routine at the location designated by element 518 in FIG. 34. This will allow the pumping routine to cause the next fluid to be pumped into the chamber prior to draining the chamber. For all of the checks performed by the drain chamber routine discussed above, if the outcome to any one of the checks is in the affirmative, the pumping microprocessor will cause the second occluding means to open the fluid outlet conduit 22 to allow the fluid in the chamber to drain into the receiving container.

The device is unique in that during the drain operation, the peristaltic pump operates in the reverse direction to generate a positive pressure in the chamber to force the fluid out of the chamber. After any necessary drain operation has occurred as indicated by the drain chamber routine, the pumping microprocessor exits the drain routine and returns to the pumping routine at the location designated by element 518 in FIG. 34.

P. Rinse Operation

Figure 37:
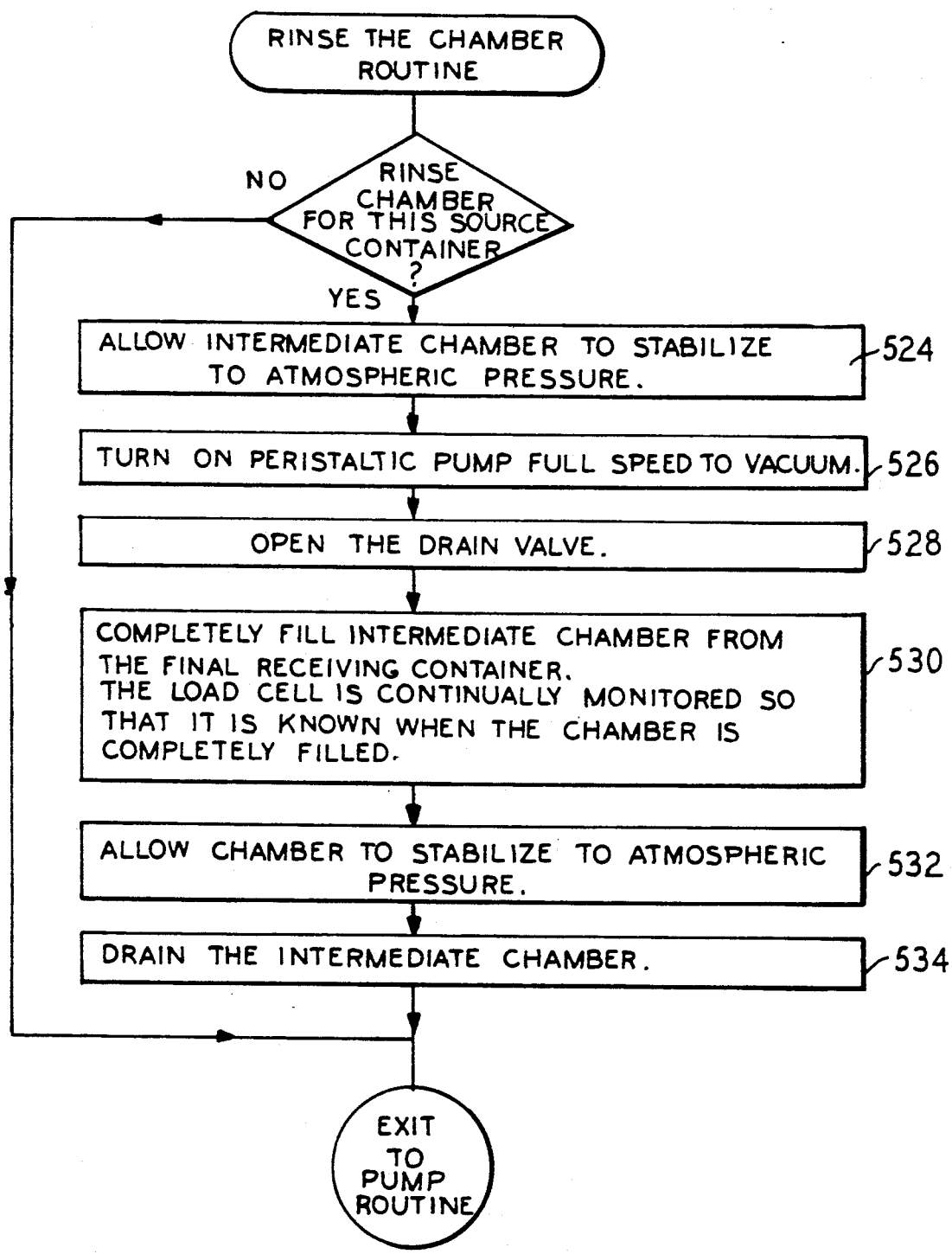
FIG. 37 is a flow chart illustrating a "rinse" routine performed by the pumping microprocessor in the preferred embodiment of the invention.

As discussed above, the next function performed by the pumping routine is to perform a rinse operation as illustrated by block 472 in FIG. 34. This operation will now be discussed in much greater detail below with respect to FIG. 37. As can be seen in FIG. 37, the first function performed during the rinsing operation is to perform a check to determine if the chamber needs to be rinsed after fluid has been transmitted from a particular source container. An operator of the device may indicate that a rinse is required when information is being entered into the device. For example, if information is to be entered through a keyboard, as discussed above, then the opertor may simply depress the "ENT RIN" key 520 (FIG. 22) with respect to a particular source container. If the information is being entered into the device through a computer terminal, then other means would be used to indicate that a particular source container requires a rinse after fluid has been transmitted from that source container. In any event, if a rinse is required, then a rinse display 222 (FIG. 26) will indicate that a rinse is required after fluid from that particular source container is transmitted to the chamber.

If a rinse is required, the next function performed by the pumping microprocessor during the rinse routine as illustrated by FIG. 37 is to allow the chamber to stabilize to atmospheric pressure. This function is illustrated by block 524. The chamber is allowed to stabilize at atmospheric pressure using the technique discussed above with respect to block 485 in FIG. 35. The pumping microprocessor then sends a signal to the peristaltic pump 105 to cause the peristaltic pump to rotate in a first direction at full speed to create a vacuum in the chamber. This function is illustrated by block 526. The pumping microprocessor next sends a signal to the second occlusion means to energize its associated solenoid valve thereby creating an open fluid communication between the chamber and the receiving container. This function is illustrated by block 528. The vacuum in the chamber causes fluid in the receiving container to be drawn into the chamber to rinse the chamber.

In the preferred embodiment of the invention, the rinsing routine allows the chamber to completely fill from the receiving container as the weight of the chamber is continuously monitored by the load cell. This function is illustrated by block 530. After the load cell has indicated that the chamber has filled, the next function performed by the pumping microprocessor during the rinse routine is to allow the chamber to stabilize once again to atmospheric pressure. This function is illustrated by block 532.

The next function performed by the rinse routine is to generate a positive pressure in the chamber using the techniques described above to cause the rinse fluid in the chamber to return to the receiving container. This is illustrated by block 534. After the chamber has been drained, the pumping microprocessor returns to the pumping routine at the location designated by element 536 in FIG. 34.

Q. Control Routine—Pumpimg Microprocessor

Figure 38:
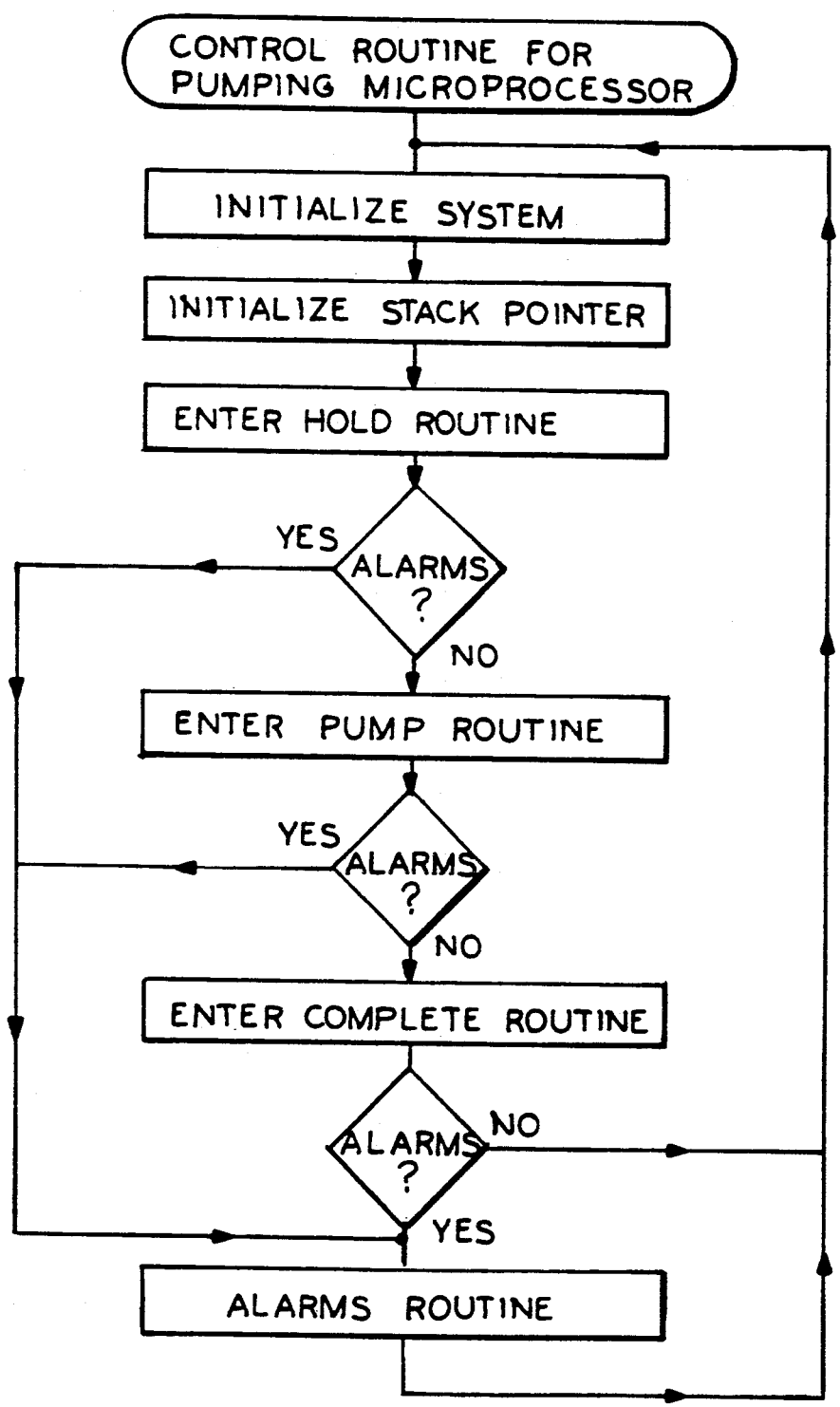
FIG. 38 is a flow chart illustrating a "pumping control" routine for the master microprocessor.

All of the routines discussed above are controlled by a pair of master control routines. Each microprocessor has its own master control routine to direct each microprocessor to the appropriate routine during operation of the device. The master control routine for the pumping microprocessor will now be discussed in greater detail below with respect to FIG. 38. As can seen in the figure, the first function performed by the control routine is to initialize the pumping microprocessor. His function is illustrated by block 340.

The next function performed by the control routine for the pumping microprocessor is to determine if any alarms have been generated. This is illustrated by decision diamond 346. The next function performed if no alarms have been generated, is to enter the pumping routine discussed above with respect to FIG. 34. This function is illustrated by block 348 in FIG. 38. The control routine then checks again to see if an alarm has been generated as illustrated by decision diamond 350. If no alarms have been generated, the control routine will then cause the pumping microprocessor to enter a complete routine. The complete routine is simply a routine which is performed after pumping has been completed. The complete routine causes the solenoid of the first occluder to be sent to its "home position". The complete routine also causes the pumping microprocessor to continue to read and filter information from the load cell.

The control routine for the pumping microprocessor then checks once again to see if any alarms have been generated as illustrated by decision diamond 354. If no alarms have been sounded, the entire control routine is repeated.

If at any point during the control routine described above an alarm is generated, the control routine will enter into an alarm routine. After appropriate action has been taken in response to the alarm, the control routine for the pumping microprocessor will be initiated once again.

R. Control Routine—Master Microprocessor

Figure 39:
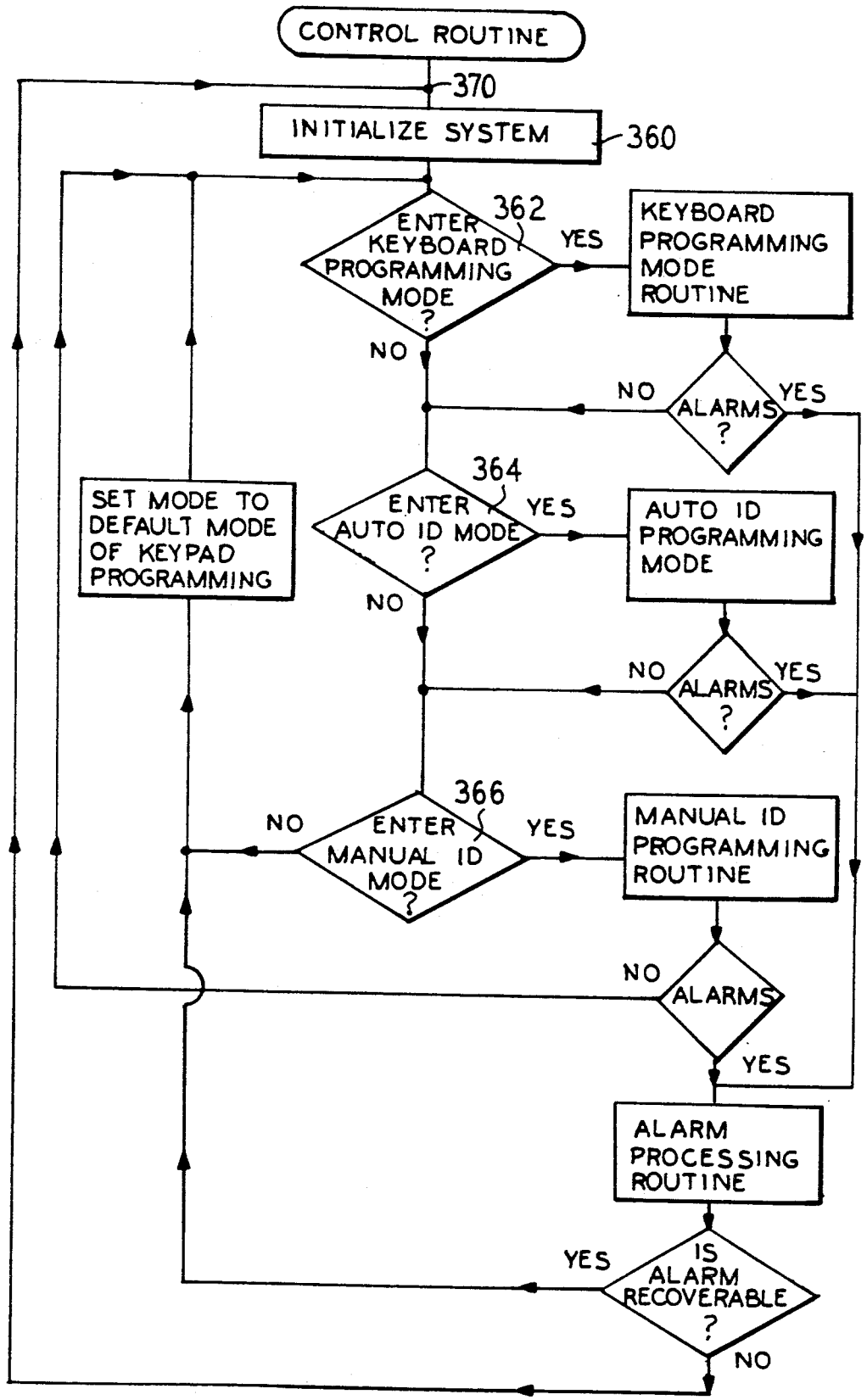
FIG. 39 is a flow chart illustrating a "master control" routine for the master microprocessor.

The control routine of the master microprocessor will now be discussed in greater detail below with respect to FIG. 39. As can be seen in the figure, the first function performed by the master control routine is to initialize the system. This is illustrated by block 360. The initialization procedure has been discussed above. After the master micropocesssor has been initialized the master control routine next performs a check to determine if it is necessary to enter the keyboard programming mode discussed above with respect to FIG. 25. This check is illustrated by decision diamond 362 in FIG. 39. If it is not appropriate to enter the keyboard programming mode, the next check performed by the master control routine is to determine if it is appropriate to enter the auto identification mode. This check is illustrated by decision diamond 364.

The next check performed by the master routine is to determine if it is appropriate to enter the manual identification mode. This check is illustrated by decision diamond 366. If it has been determined during each of the three checks described above to enter into one of the various modes in which information is entered by an operator into the device, the master control routine will allow the information to be entered. However, as can be seen in FIG. 39, during this process, the master control routine is continuously checking for the presence of any alarms generated by the system. In the event that any alarm has been generated, the master control routine will cause the master microprocessor to enter into an alarm processing routine. If the alarm is one from which the device can be recovered from easily, the appropriate action will be taken, and the master control routine will return to a default mode of keyboard programming in the preferred embodiment of the invention. If the alarm is not a "recoverable alarm", then the master control routine will cause the master microprocessor to return to the location designated by element 370 in FIG. 39.

In one embodiment of the invention, a means may be provided for generating a record of the actual transfer of multiple fluids into a single source container. In this embodiment, information generated by the master and pumping microprocessors may be transmitted to a standard printer through appropriate software to generated a written record of the actual fluid and amount of fluid transferred.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A device for accurately transferring multiple individual fluids from multiple source containers to a single receiving container, in which fluid flows from said multiple source containers through individual fluid conduits to a chamber having a chamber fluid outlet conduit in fluid communication with the single receiving container, the chamber also having a pressure conduit, the invention comprising:

first occlusion means for selectively preventing fluid flow from each of said individual fluid conduits to said chamber;

pressure means for selectively creating positive and negative pressures in said chamber to control the rate of fluid flow through said chamber;

second occlusion means for selectively occluding fluid flow from said chamber outlet fluid conduit to said receiving container; and control means for controlling said first and second occlusion means and said pressure means, said control means causing said first occlusion means to allow fluid to flow through at least one of said individual fluid conduits while causing said second occlusion means to prevent fluid flow into said receiving container and simultaneously causing said pressure means to create a negative pressure in said chamber to precisely control the amount of fluid flow into said chamber, said control means further causing said first occlusion means to prevent fluid flow through all of said individual fluid conduits after a predetermined amount of fluid has been delivered to said chamber, said control means then further causing said second occlusion means to allow fluid to flow from said chamber through said outlet conduit while simultaneously causing said pressure means to create a positive pressure in said chamber to force fluid from said chamber into said receiving container;

wherein said individual fluid conduits include arcuate portions shaped to reduce loading forces on said chamber.

2. The device of claim 1, wherein said arcuate portions of said fluid conduits are substantially semicircular in shape.

3. The device of claim 1, wherein said arcuate portions of said fluid conduits comprise semicircles spanning 180°.

4. The device of claim 1, wherein one end of each of said arcuate portions is secured to a support while said other end is secured to said chamber, said chamber in turn being attached to a load cell arm.

5. The flexible, resilient conduit of claim 1, wherein said conduit is constructed of an elastomeric material such as polyvinylchloride or silicon.

6. A device comprising a load cell with a chamber, a support spaced therefrom, and a flexible, resilient conduit coupled to said load cell chamber for conveying fluid to said chamber for weighing of a quantity of said fluid, said conduit being attached to said support spaced apart from said load cell chamber and being sufficiently arcuate in shape between said support and said chamber so as to substantially reduce an influence of said conduit on load cell measurements due to resiliency relaxation and weight forces of said conduit on said load cell chamber.

7. The flexible, resilient conduit of claim 6, wherein said arcuate shape comprises a substantially semicircular arch.

8. The flexible, resilient conduit of claim 6, wherein said arch spans 180°.

9. In a compounding device for transferring one or more fluids from one or more source containers to a receiving container, wherein fluid quantities are transferred to a load cell chamber, weighed, and then transferred to said receiving container:

at least one source container;

a load cell with a chamber;

a support spaced from said chamber;

and, a flexible, resilient conduit coupling said at least one source container to said load cell chamber, said conduit having an arcuate portion, one end of which is coupled to said chamber, another end of which is attached to said support spaced apart from said chamber, said portion being sufficiently arcuate to substantially eliminate loading influences of said conduit on load cell measurements.

10. In the device of claim 9, wherein said arcuate portion comprises a substantially semicircular arch.

11. In the device of claim 9, wherein said arch spans 180°.

12. The device of claim 11, wherein said arcuate portion spans 180°.

13. In the device of claim 9, wherein said conduit is constructed of an elastomeric material such as polyvinylchloride or silicone.

14. The device of claim 13, wherein said arcuate portion comprises a substantially semicircular shape.

15. A device comprising:

a fluid source;

a load cell having a chamber within which one or more fluids to be weighed can be received;

a conduit coupling said fluid source to said load cell chamber; and a support spaced apart from said chamber, said conduit being secured to said support so as to form an arcuate portion extending between said support and said chamber, said arcuate portion being sufficiently shaped to substantially eliminate loading influences of said conduit on load cell measurements.

16. A device comprising a weighing apparatus with a chamber, a support spaced from the chamber, and a flexible conduit coupled to the chamber to convey fluid thereto, the conduit having a portion that is bent into a semicircular arch, one end of the arch being secured to the chamber, another end of the arch being secured to the support that is separate from the chamber, the chamber being displaced relative to the support.

17. The flexible conduit of claim 16, wherein the conduit is a tube constructed of an elastomeric material.

18. The flexible conduit of claim 16, wherein the weighing apparatus is a load cell.

19. The flexible conduit of claim 16, wherein the weighing apparatus and the conduit from parts of a compounding device for compounding minute quantities of fluids.

20. The flexible conduit of claim 16, wherein the conduit and weighing apparatus are integral components of a device for transferring varying quantities of multiple fluids located upstream of the chamber to a single receptacle located downstream of the chamber.

* * * * *